(12) United States Patent
Gergek

(10) Patent No.: US 9,930,840 B1
(45) Date of Patent: Apr. 3, 2018

(54) POTTED PLANT SYSTEM

(71) Applicant: Franc Gergek, Quebec (CA)

(72) Inventor: Franc Gergek, Quebec (CA)

( * ) Notice: Subject to any disclaimer, the term of this patent is extended or adjusted under 35 U.S.C. 154(b) by 0 days.

(21) Appl. No.: 15/286,293

(22) Filed: Oct. 5, 2016

(51) Int. Cl.
*A01G 27/02* (2006.01)
*A01G 27/04* (2006.01)
*A01G 27/06* (2006.01)
*A01G 27/00* (2006.01)

(52) U.S. Cl.
CPC ........... *A01G 27/06* (2013.01); *A01G 27/008* (2013.01); *A01G 27/02* (2013.01); *A01G 27/04* (2013.01)

(58) Field of Classification Search
CPC .... A01G 27/00; A01G 27/005; A01G 27/008; A01G 27/02; A01G 27/04; A01G 27/06
USPC .................................. 47/79, 81, 82
See application file for complete search history.

(56) References Cited

U.S. PATENT DOCUMENTS

| | | | | |
|---|---|---|---|---|
| 3,753,315 A * | 8/1973 | Adam | ..................... | A01G 27/06 47/79 |
| 3,990,179 A | 11/1976 | Johnson | | |
| 4,083,147 A * | 4/1978 | Garrick | ................ | A01G 27/003 137/397 |
| 4,102,081 A | 7/1978 | Morrow | | |
| 4,885,870 A * | 12/1989 | Fong | ....................... | A01G 27/06 47/79 |
| 4,993,186 A * | 2/1991 | Immonen | ............... | A01G 27/04 47/48.5 |
| 5,446,994 A * | 9/1995 | Chou | ..................... | A01G 27/06 47/65.6 |
| 5,782,035 A * | 7/1998 | Locke | .................... | A01G 27/00 47/79 |
| 5,829,193 A | 11/1998 | Otake | | |
| 6,276,090 B1 * | 8/2001 | Lai | ....................... | A01K 63/003 47/79 |
| 6,363,658 B1 * | 4/2002 | Lai | ........................ | A01G 27/06 119/246 |
| 6,418,664 B1 * | 7/2002 | Shaw | ..................... | A01G 27/04 47/79 |
| 6,729,070 B1 * | 5/2004 | Locke | .................... | A01G 27/00 47/79 |
| 8,065,834 B2 * | 11/2011 | Eckert | .................... | A01G 9/028 47/66.1 |
| 8,146,292 B2 * | 4/2012 | Brandstatter | .......... | A01G 27/02 47/79 |
| 9,009,885 B2 * | 4/2015 | Faasse | ..................... | E03C 1/22 137/15.23 |

(Continued)

*Primary Examiner* — David J Parsley
(74) *Attorney, Agent, or Firm* — Cherskov Flaynik & Gurda, LLC

(57) ABSTRACT

The potted plant system of the present invention uses the space between the inner and outer pots as a reservoir for water. The water reservoir acts passively to transport water into the spoil of the inner pot which is subsequently used by the potted house plant. The reservoir is filled by over watering the inner pot and allowing the excess water to pass through the apertures within the inner pot. Passive transport of water from the reservoir to the soil occurs as the water saturation of the soil decreases. As a result, the soil and the potted plant remain hydrated for longer period of time as the reservoir continuously replenishes the water. The water within the reservoir can be drained through a quick connect sliding valve located on the outer pot. The quick connect sliding valve is either placed above another water receptacle or is fitted with a hose that transports the water to a drain.

8 Claims, 27 Drawing Sheets

(56) References Cited

U.S. PATENT DOCUMENTS

2013/0291435 A1* 11/2013 Gettig .................... A01G 27/02
                                                           47/79
2015/0096228 A1*  4/2015 Watson ................ A01G 27/008
                                                           47/79

* cited by examiner

35

POTTED PLANT SYSTEM

FIELD OF THE INVENTION

The present invention relates to the field of plant watering systems and more specifically to a plant watering system have a quick-connect sliding valve.

BACKGROUND

Watering of potted plants has long been an inconvenient task for commercial and at home users. Plants with dense foliage or blossoms are generally watered from the top, using a spray nozzle or a watering bucket. As some potted plants are hung from at an elevated height, the effort required to fully water the plants is even more challenging. Most of the water sprayed onto the plants runs down the dense foliage and end up on the floor. In order to direct most of the water into the soil of each potted plant, the user must push aside the dense foliage, locate the pot and pour water directly into the top soil. Water has to be applied relatively slowly in order to allow for absorption. As users of potted plants, in general, have more than one potted plant, the user is required to replenish the water of multiple potted plants at various points in time. This can often be quite laborious and time consuming. Users often forget the correct times to water certain potted plants, causing the plant to become dehydrated and die or not present well. There is a need in the industry for a viable method of controlling the water within the potted plant and provide a means of maintaining water within the soil so as to decrease the number of times the plant is manually watered. Additionally, there is a need within the industry for potted plant system that maintains water saturation of the soil at an optimum levels thereby providing maximum growth and plant development.

Various attempts have been made to alleviate the inconvenience associated with watering of potted plants. Devices such as: U.S. Pat. No. 3,990,179 (Johnson); U.S. Pat. No. 4,102,081 (Morrow); and, U.S. Pat. No. 5,829,193 (Otake), provide such examples of potted plant systems.

Johnson discloses a pot for plants primarily used for a hanging pot. The purpose of the Johnson is to provide for an aesthetically pleasing hanging pot. Johnson attempts to provide an aesthetically pleasing pot by providing numerous openings throughout the pot which are subsequently penetrated by stems and branches of the plant. As such, stems or main branches of the plant protrude through the openings and effectively conceal the pot. The pot described in Johnson contains walls with drainage openings that allow water to flow into the drainage tray. Johnson does not provide a mechanism of storing excess water that is subsequently used to maintain water saturation within the soil of the hanging potted plant. Additionally, the pot described in Johnson does not provide a mechanism for draining the excess liquid from the hanging potted plant.

Morrow discloses an improved plant and flower container of the hanging type comprising a pot having a removable false bottom to provide a compartment for collecting and storing excess water for subsequent absorption by the plant. Additionally, the pot disclosed by Morrow provides a method of providing a hanging means that is centrally located through the middle of the pot. Morrow does not provide a mean of draining excess water, thereby allowing the squelching the pot and essentially the drowning of the plant. Additionally, Morrow does not provide a means of transporting excess water, which is pooling at the base of the pot up to the middle of the soil, thereby ensuring most of the roots of the plant have access to the water. Morrow's pot allows for reabsorption through simple apertures at the bottom of the pot. Depending on the water level in the excess water collection dish, the apertures may provide a means of water reabsorption into the bottom of the soil. Furthermore, Morrow's hanging pot does not provide a means for expelling excess water. The user of Morrow's pot is required to unhang the pot and drain the excess water manually.

Otake discloses a horticultural pot that is constructed of multiple highly absorbent layers which provide increased water retention. The multiple layers of the Otake pot are comprised of a super-absorbent-polymer-powder layer and a peat-moss-powder lawyer, which are interposed between an inner wall material constituted by a jute layer. The material provides a natural material, rich in air permeability, easily compatible with the roots of plants to enter. The pot disclosed in Otake does not provide a means of controlling excess water nor does it provide a means of draining excess water.

As such, there is a need for a potted plant system that can overcome the drawbacks as described above. Indeed, there is a need for a potted plant system that provides a means to control excess water in a manner that allows the water to be reabsorbed by the soil within the pot thereby increasing the time between watering. There is also a need for a potted plant system that provides a quick and efficient means for expelling excess water.

BRIEF DESCRIPTION OF THE DRAWINGS

It will now be convenient to describe the invention with particular reference to one embodiment of the present invention. It will be appreciated that the drawings relate to one embodiment of the present invention only and are not to be taken as limiting the invention.

DETAILED DESCRIPTION

The present invention will now be described more fully hereinafter with reference to the accompanying drawings, in which preferred and other embodiments of the invention are shown. No embodiment described below limits any claimed invention and any claimed invention may cover processes or apparatuses that are not described below. The claimed inventions are not limited to apparatuses or processes having all the features of any one apparatus or process described below or to features common to multiple or all of the apparatuses described below. It is possible that an apparatus or process described below is not an embodiment of any claimed invention. The applicants, inventors or owners reserve all rights that they may have in any invention claimed in this document, for example the right to claim such an invention in a continuing application and do not intend to abandon, disclaim or dedicate to the public any such invention by its disclosure in this document.

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements co-operate or interact with each other (e.g. as in a cause and effect relationship).

Figure 1:
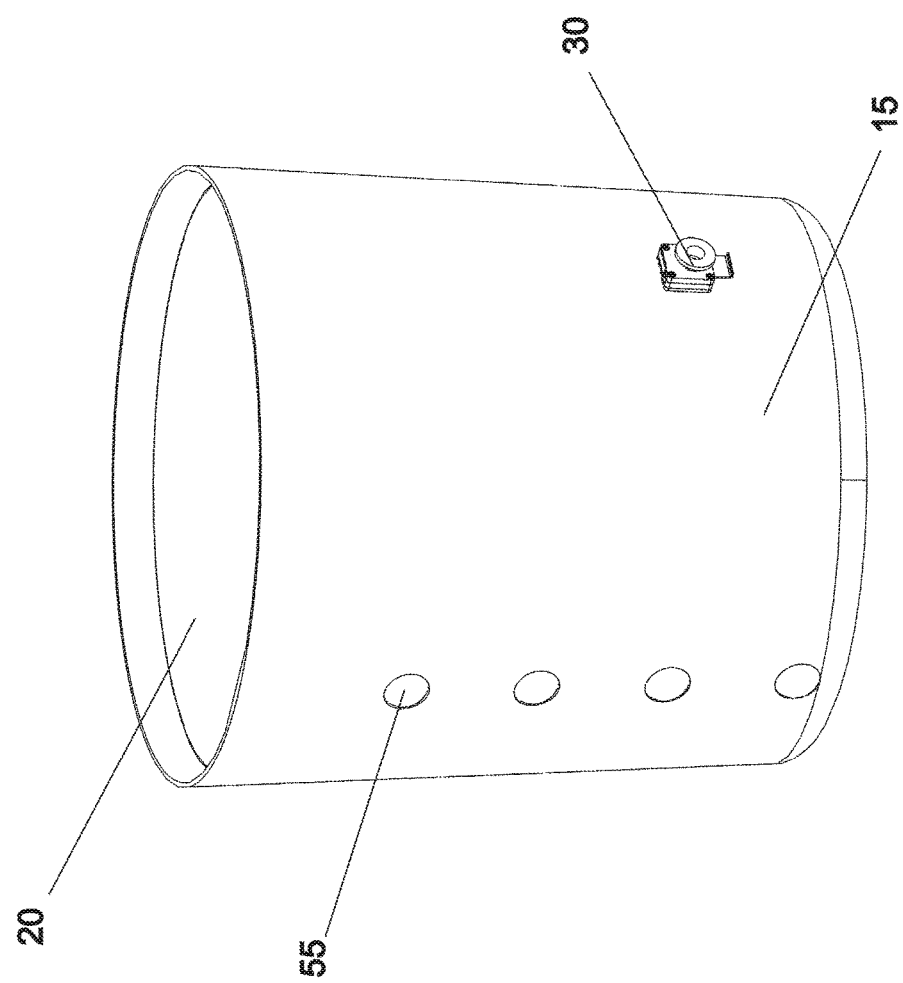
FIG. 1 is a perspective view of a potted plant system, according to one embodiment of the present invention.
Figure 2:
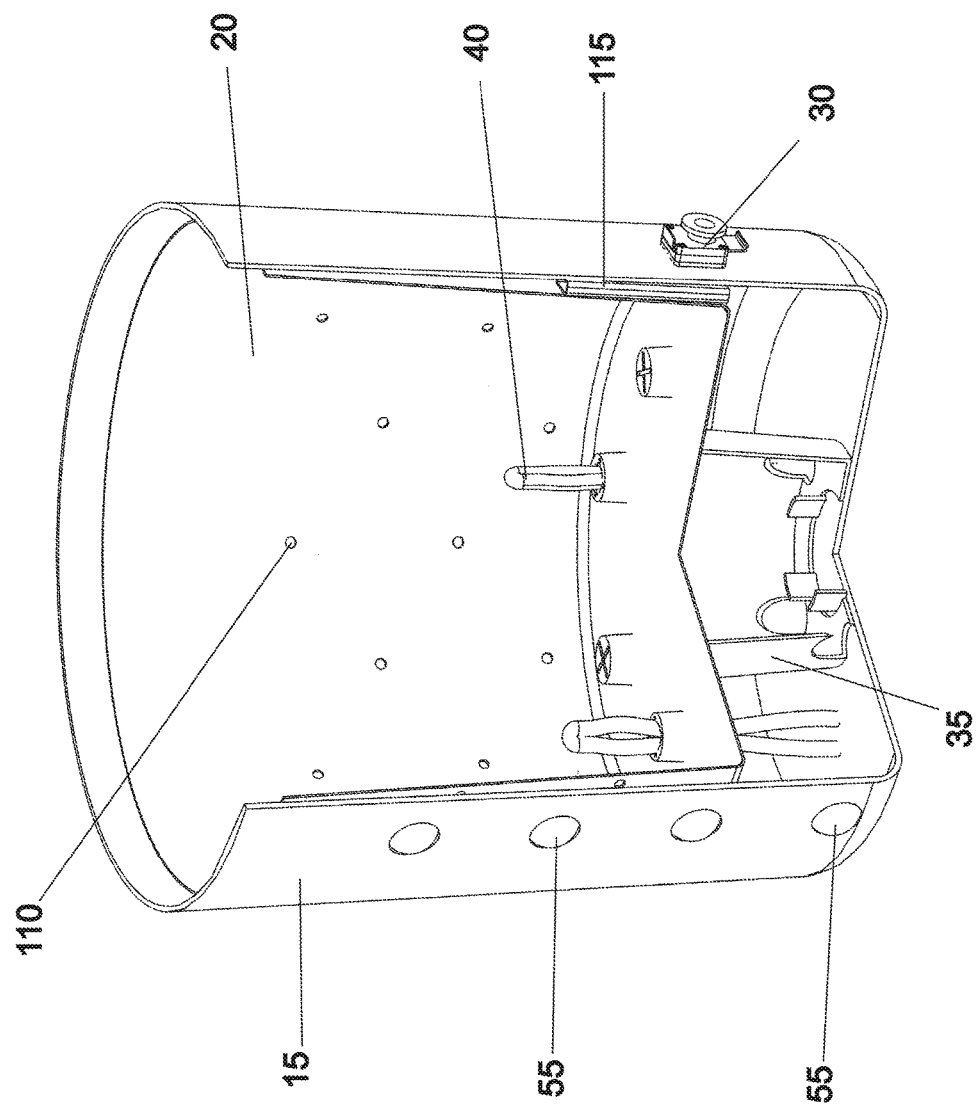
FIG. 2 is a perspective cut-out view of a potted plant system, according to one embodiment of the present invention.
Figure 3:
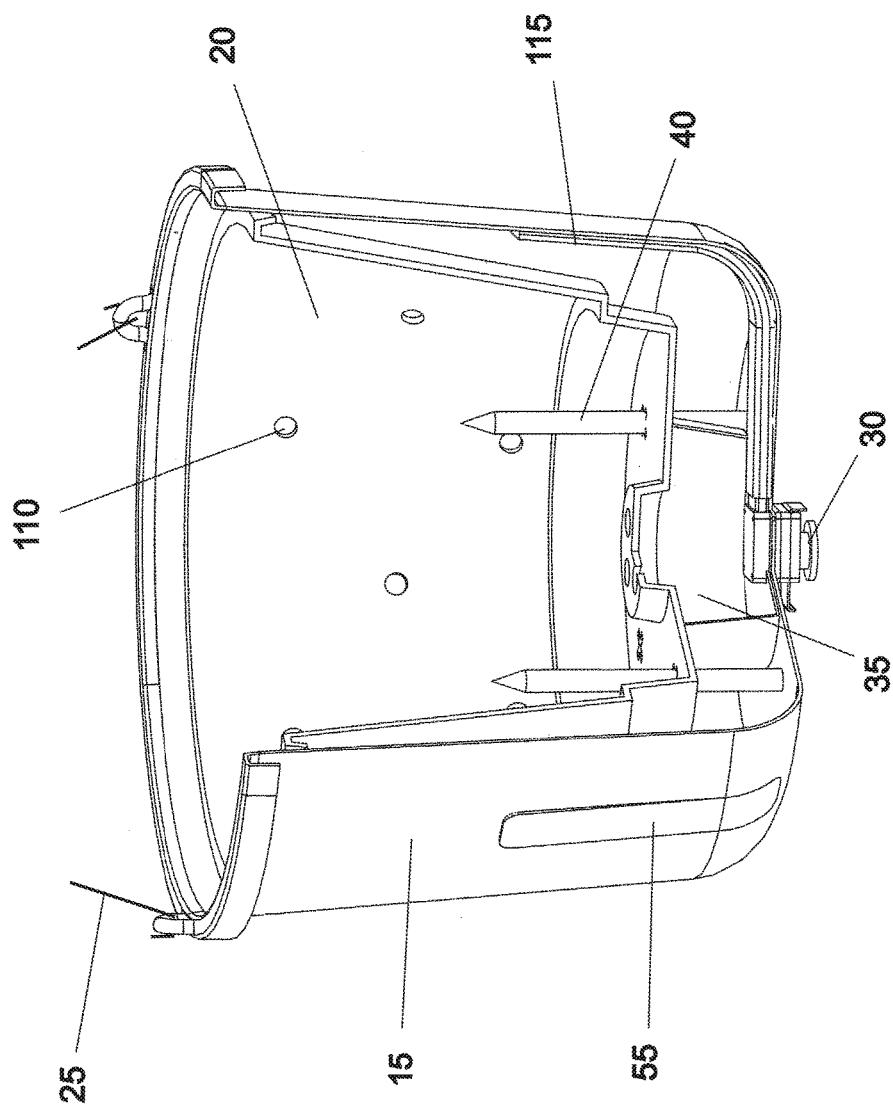
FIG. 3 is a perspective cut-out view of a hung potted plant system, according to one embodiment of the present invention.

With reference to FIGS. 1, 2, and 3, and according to one embodiment of the present invention, a potted plant system 10 is shown. The potted plant system 10 is comprised of: an outer pot 15; an inner pot 20; pot hanging system 25; a quick connect sliding valve 30; spacer 35; and a water level adaptor 115. The potted plant system 10 provides the user an ability to alter the scheduling of water maintenance of potted plants by extending the time between watering. Extended periods between watering is one key aspect of the potted plant system 10. Through the creation of a reservoir, a space in between the inner and outer pot, 20 and 15 respectively, water can be stored within the hanging potted plant system 10. The reservoir volume can be increased through the use of a spacer 35. The stored water (not shown) is reabsorbed by the soil housing the plotted plants. Reabsorption can occur through a fluid connectivity between the dispersed apertures 110 located throughout the body of the inner pot 20 and the reservoir. In addition, the fluid connectivity between the linearly dispersed apertures 110 and the reservoir provides a means for excess water to drain from the inner pot 20 to the reservoir during watering. Reabsorption can also occur through the use of wicks 40, which operates under capillary action to transport water from the reservoir to the center of the soil. As water saturation in the soil decreases, the water within the reservoir is passively transported to the soil, thereby rehydrating the potted plant (not shown). A worker skilled in the relevant art would appreciate the various means of passively transferring water from the reservoir to the soil based on the saturation level of the soil. The quick connect sliding valve 30 provides for a means of expelling excess water from the potted plant system 10. The user can expel the excess water by opening the quick connect sliding valve 30. A user can maintain a predetermined amount of excess water from being displaced from the potted plant system through the addition of the water level adapter 115. Thereby the user can ensure that a desired amount of water remains within the outer pot 15 after draining. Additionally, the watering of the potted plant system 10 can be achieved automatically through the use of electronic water sensors and a system of automated valves that are connected to a water source and open upon the requirement of additional water. The potted plant system 10 can be used on pots that are positioned on a surface, such as the floor or a table, or on pots that are hung. The location of the quick connect sliding valve 30 differs depending on the intended positioning of the potted plant system 10. If the potted plant system 10 is placed on a surface, the quick connect sliding valve 30 is positioned on the side of the outer pot 15. As such excess water can be removed without the requirement of a special stand or the lifting the potted plant system 10. Such quick connect sliding valve positioning can be seen in FIGS. 1 and 2. On the other hand, if the potted plant system 10 is hung, the quick connect sliding valve 30 is placed at the bottom of the outer pot 15. With such a placement a user can operate the quick connect sliding valve 30 with ease and without the need of unhanging of the potted plant system 10. Such quick connect sliding valve positioning can be seen in FIG. 3. Water pooled in the reservoir will be drained only to the height of the water level adapter as seen in FIG. 3. The water reservoir helps extend the length of time between watering the plants without over saturating the soil within the potted plant system 10. The water level adapter 115, based on the positioning of the quick connect sliding valve 30, can have varying heights. A worker skilled in the relevant art would appreciate the various heights the water level adaptor 115 can take in order to maintain water in the inner pot 20 while extending past the water reservoir (not shown). A worker skilled in the relevant art would also appreciate that the potted plant system 10 can be comprised of all the elements or can be comprised with one or two elements missing. Elements of the potted plant system 10 can be removed based on user requirements and plant needs. Depending on the plant, the amount of user interaction, and placement of the potted plant system 10, such variables modifies the need for all elements described herein. For example, the inner pot 20 can be the pot in which the potted plant is purchased, thus reducing the need for a user to replant the potted plant in a potted plant system specific inner pot 20.

With reference to FIG. 3 and according to one embodiment of the present invention, to ensure optimal amount of water is within the reservoir, the outer pot 15 contains a water level indicator 55. The water level indicator 55, can be a clear portal so the user can see within the outer pot 15. The clear portal can be multiple small apertures that indicate water level, as seen in FIGS. 1 and 2. Alternatively, a water level indicator 55 can also be comprised of an electrical system, wherein the level of water is assessed and digitally displayed on an electronic water monitor (not shown). The spacer 35 raises the inner pot 20 within the outer pot 15, thereby providing for a larger reservoir for water to collect.

Figure 4:
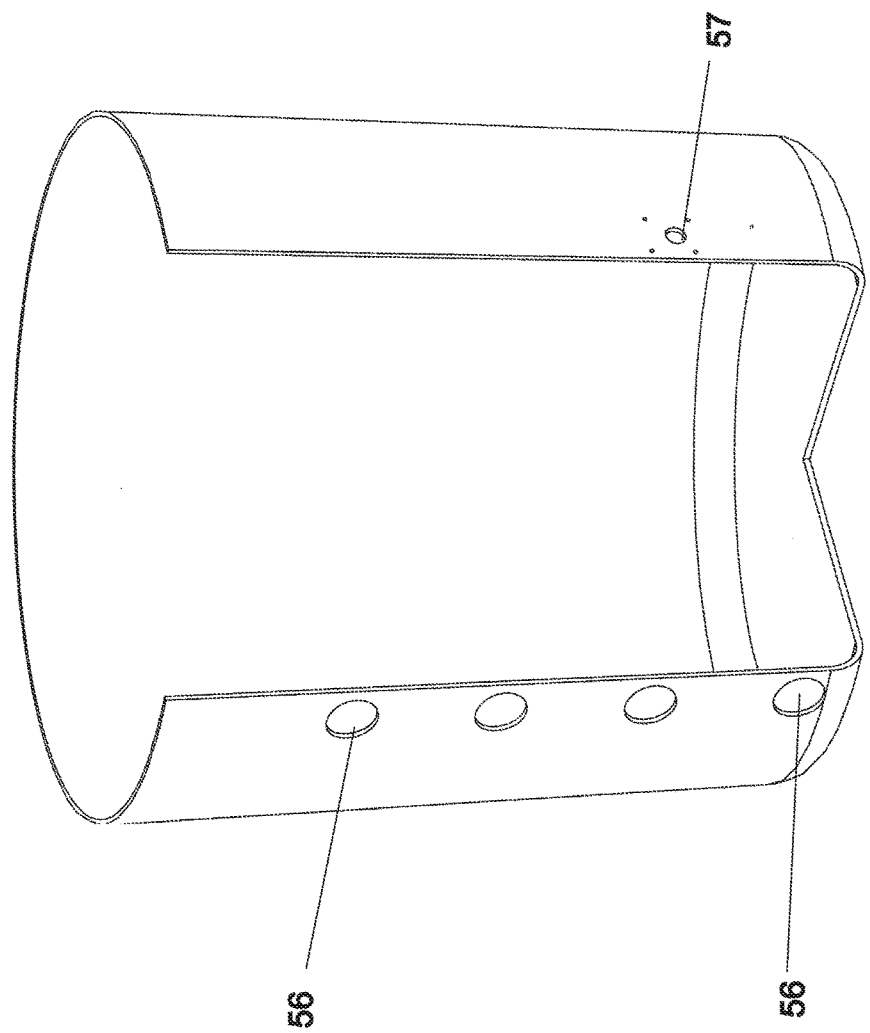
FIG. 4 is a perspective cut-out view of outer pot, according to one embodiment of the present invention.

With reference to FIG. 4 and according to one embodiment of the present invention the outer pot 15 is shown in detail. The outer pot 15 contains a large opening at the top, and a small passage 45 on either the side or on the bottom. The large opening at the top of the out pot 15 provides an opening for insertion of the inner pot (not shown) containing the soil and the potted plant. The inner pot (not shown), can be a specific pot designed to fit within the outer pot 15, or it can be the generic pot in which the potted plants are sold within at the local plant nursery. The small passage 45 provides for a means for draining excess water that was poured into the potted plant system (not shown). The water level apertures 56 are shown in a linear arrangement. The water level apertures 56 correspond to the water level indicator, as clear glass is placed within the water level apertures 56. A water level indicator 55 allows the user to determine the water level located within the outer pot 15. The water level apertures 56 provide a visual reference for various water level heights within the reservoir (not shown). A worker skilled in the relevant art would appreciate the various means of indicating the water level within the outer pot 15. The bore 57 permits for the attachment of the quick connect sliding valve 30 which provides for water transfer from the reservoir (not shown).

Figure 5A:
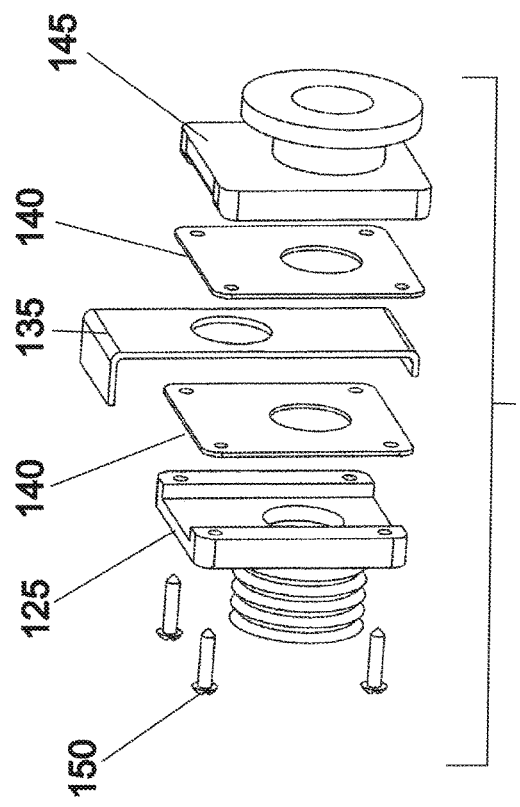
FIG. 5a is a perspective exploded view of a quick connect sliding valve, according to one embodiment of the present invention.
Figure 5B:
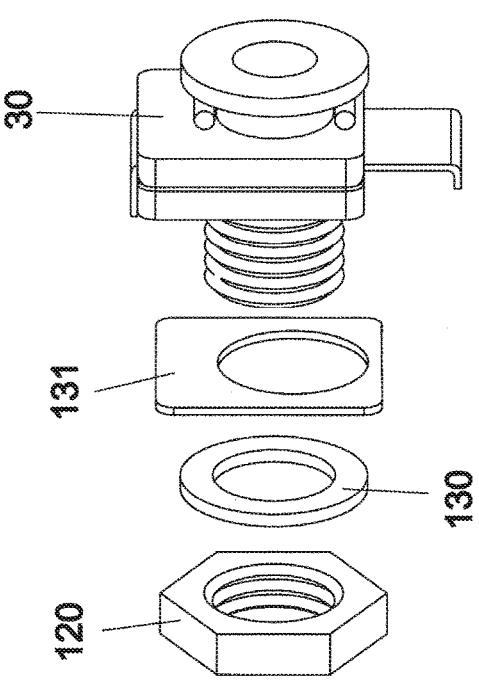
FIG. 5b is a perspective view of a quick connect sliding valve with nut and washer outer pot attachment, according to one embodiment of the present invention.
Figure 6:
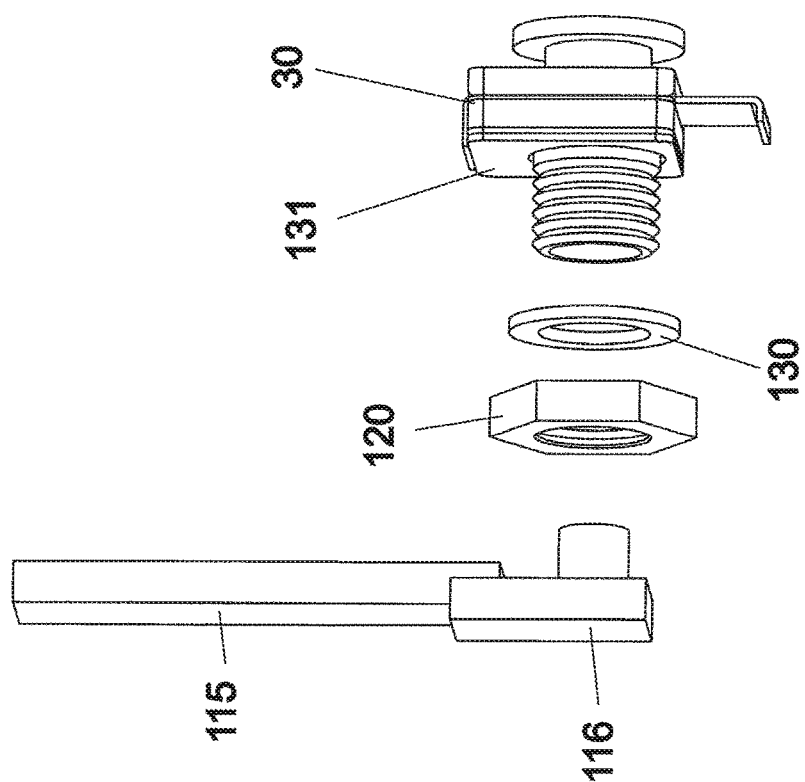
FIG. 6 is a perspective exploded view of a quick connect sliding valve with a water level adaptor, according to one embodiment of the present invention.

With reference to FIGS. 5 and 6, and according to one embodiment of the present invention, the quick connect sliding valve 30 and the associated components are shown in greater detail. The quick connect sliding valve 30 can be used within the potted plant system as a standalone device, or it can be accompanied by a water level adapter 115, as shown in FIG. 6. The quick connect sliding valve 30 is primarily comprised of: lug 125; slider bar 135; seal 140; outer neck enclosure 145; and, attachment screws 150. To attach the quick connect sliding valve 30 onto the outer pot (not shown), a nut 120 and first and second washers, 130 and 131 respectively, are employed. The nut 120 fastens the sliding valve 30 onto the outer pot (not shown), while the first washer 130 is adapted to the surface of the pot and the second washer 131 seals aperture to ensure a waterproof seal. A worker skilled in the relevant are would appreciate that the first and second washers, 130 and 131 respectively, can be comprised of rubber or silicone. With specific reference to FIG. 6 the quick connect sliding valve 130 is shown connecting, in an exploding view, to the draining pipe 115. In the configuration shown in FIG. 6 and according to one embodiment of the present invention, the quick connect sliding valve 30 is attached to the side of the outer pot (not shown). The nut 120 and the first and second washers, 130 and 131 respectively, attach the quick connect sliding valve 30 to the outer pot (not shown). The valve adaptor 116 sets within the quick connect sliding valve 30 and functions to connect the water level adapter 115 to the quick connect sliding valve 30. The water level adaptor 115 functions to increase the water level in the reservoir in the outer pot (not shown) from the location of the quick connect sliding valve 30 to the top of the water level adaptor 115.

Figure 7B:
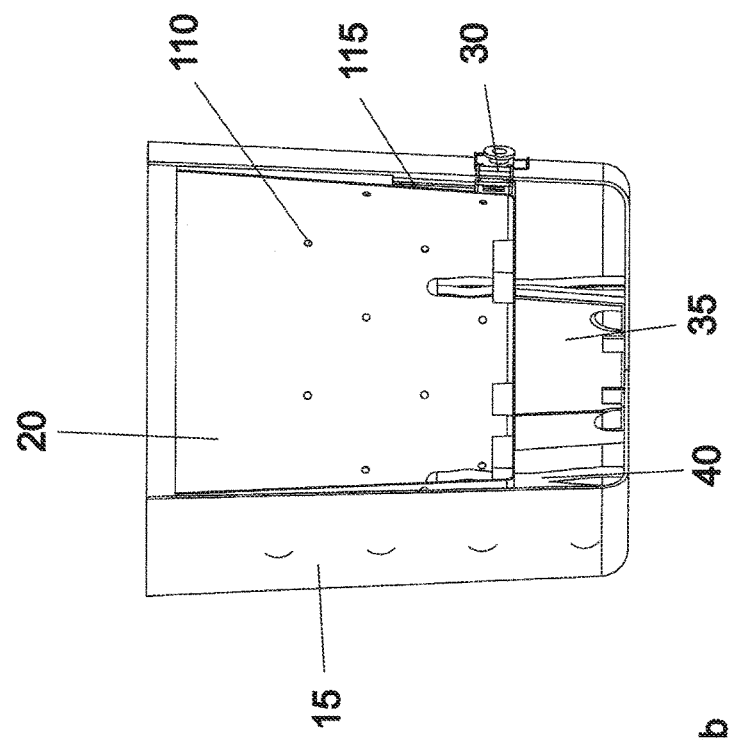
FIG. 7b is a perspective cut out view of a potted plant system having a quick connect sliding valve with a water level adaptor positioned on a wall/side of the outer pot, according to one embodiment of the present invention.
Figure 7A:
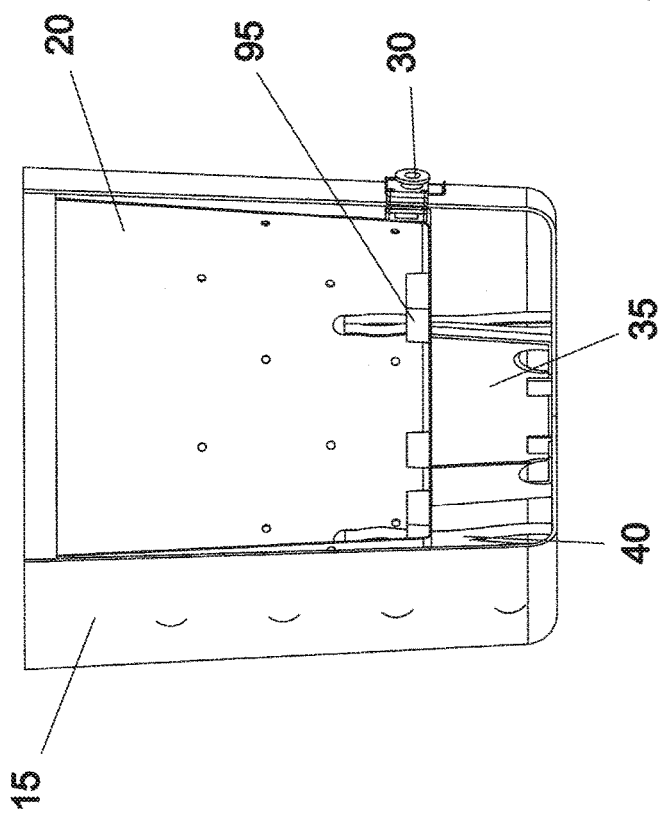
FIG. 7a is a perspective cut out view of a potted plant system having a quick connect sliding valve positioned on the side of the outer pot, according to one embodiment of the present invention.

With specific reference to FIGS. 7a and 7b, and according to one embodiment of the present invention, a cut out of the potted plant system 10 is shown. The potted plant system 10 is shown containing: outer pot 15; inner pot 20; spacer 35; quick connect sliding valve 30 located on the side of the outer pot 15; and a wick 40. The spacer 35 increased the water reservoir between the outer pot 15 and the inner pot 20. The wicks 40 transfer water from the reservoir to the soil within the inner pot 20. With specific reference to FIG. 7a, the potted plant system 10 is shown without the water level adaptor 115. In this configuration, the water reservoir will be maintained up to the level of the quick connect sliding valve 30 location. In this case the water reservoir will be maintained up to the to base of the inner pot 20. As such the only means of absorbing water from the reservoir to the soil in the inner pot 20 is through the wicks 40. The inner pot 20 contains multiple projecting columns 95. The projecting columns 95 provide for a means for objects, such as wicks 40 to penetrate into the inner region of the inner pot 20. The level of the water reservoir is maintained at the level of the quick connect sliding valve 30 as water will stop draining from an open quick connect sliding valve 30 at that point. With specific reference to FIG. 7b a water level adaptor 115 is connected to the quick connect sliding valve 30. In this configuration, the reservoir is maintained to the top of the water level adaptor 115. As such, water will surpass the inner pot 20 base. As such, the bottom soil will be submerged. It is not optimal to have most of the soil submerged in water as plants suffer from a lack of oxygen, leading to death of roots and a loss in plant vigor. Water is reabsorbed by the soil through the wick 40 and inner pot 20 dispersed apertures 110.

Figure 8:
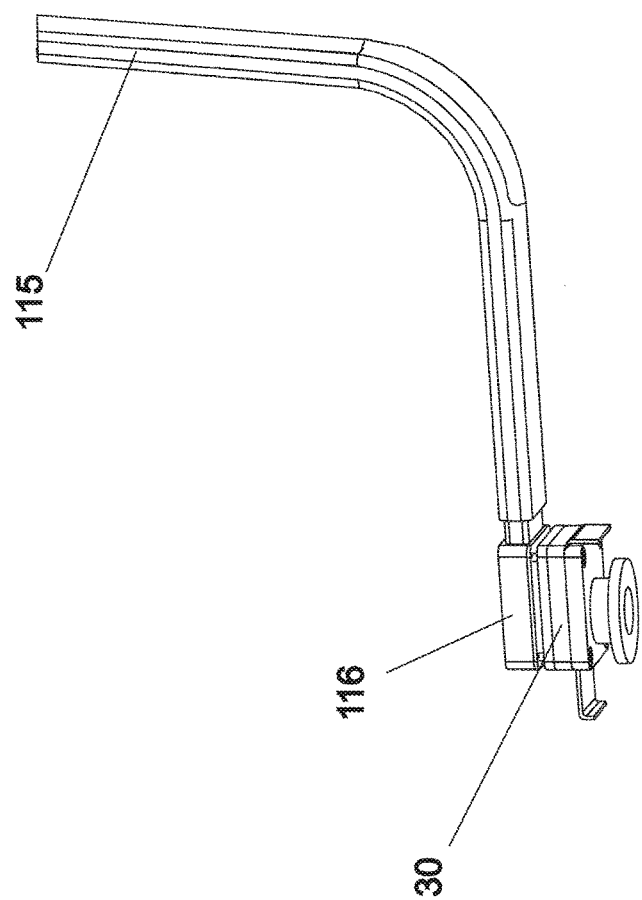
FIG. 8 is a perspective view of a quick connect sliding valve which is designed to be positioned on the bottom of the outer pot, fitted with a water level adaptor, according to one embodiment of the present invention.

With specific reference to FIG. 8 and according to one embodiment of the present invention, the quick connect sliding valve 30 is shown in bottom attachment configuration connected to the water level adaptor 115. The positioning of the quick connect quick connect sliding valve 30 influences the shape of the water level adaptor 115. With specific reference to FIG. 8, the quick connect quick connect sliding valve 30 is positioned on the bottom of the outer pot (not shown). In this configuration, the quick connect sliding valve 30 is fitted with a valve adaptor 116, which facilitates the connection of the water level adaptor 115 that extends upwards. The valve adaptor 116 can vary to accommodate the positioning of the quick connect sliding valve 30 and water level adaptor 115 connection. A worker skilled in the relevant art would appreciate the various means of attaching the water level adaptor 115 to the inner portion of the quick connect sliding valve 30. In this configuration, the valve adaptor 116 is positioned to attach to the water level adaptor 115 at the side of the quick connect sliding valve 30. To accommodate the positioning of the inner pot (not shown) within the potted plant system (not shown), the water level adaptor 115 is curved as to allow fitment of the inner pot (not shown) but also extend along the side of the outer pot wall (no shown). The quick connect sliding valve 30 operates in a manner where the user can manually open and close the valve by sliding the slider from the open to the closed position. A worker skilled in the relevant art would appreciate the various valve designs which would allow a user to manually operate the valve. A worker skilled in the relevant art would also appreciate the various automatic valves that can operate under pressure, to release excess water or operate electronically.

Figure 9:
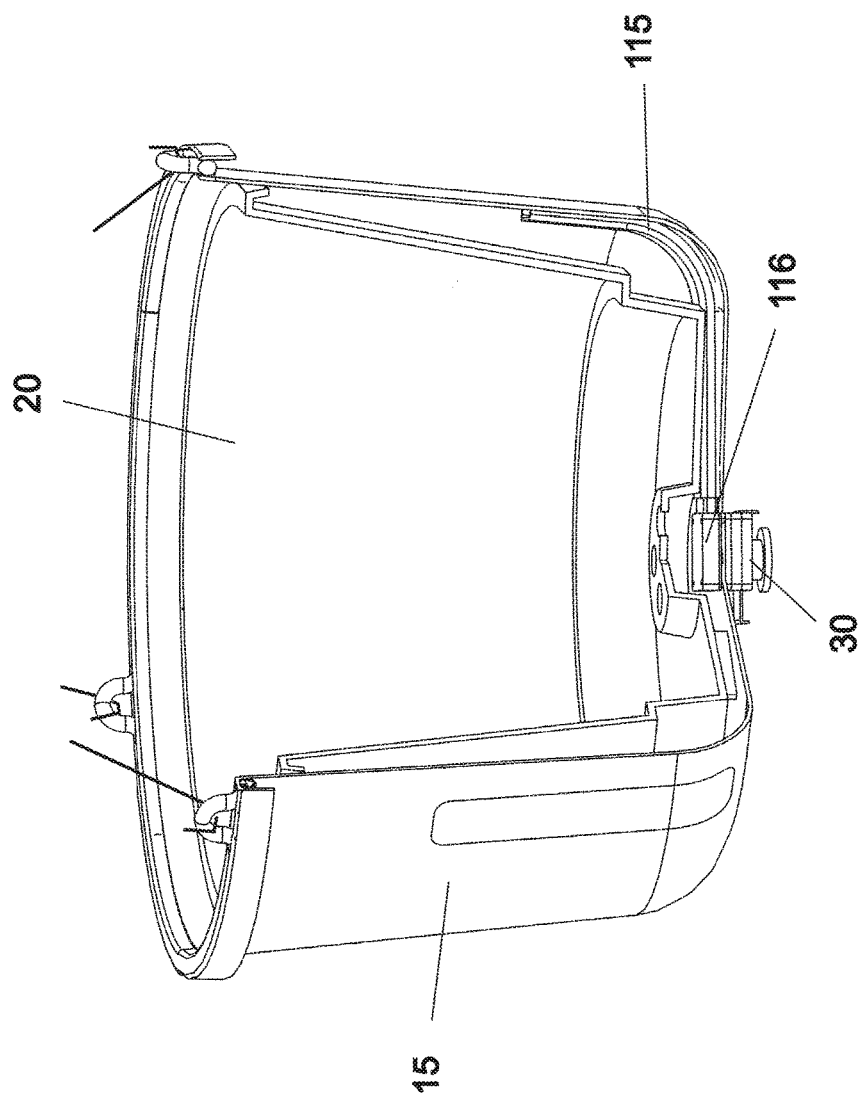
FIG. 9 is a perspective cut-out view of a hung potted plant system employing a valve adaptor and a water level adaptor, according to one embodiment of the present invention.
Figure 10:
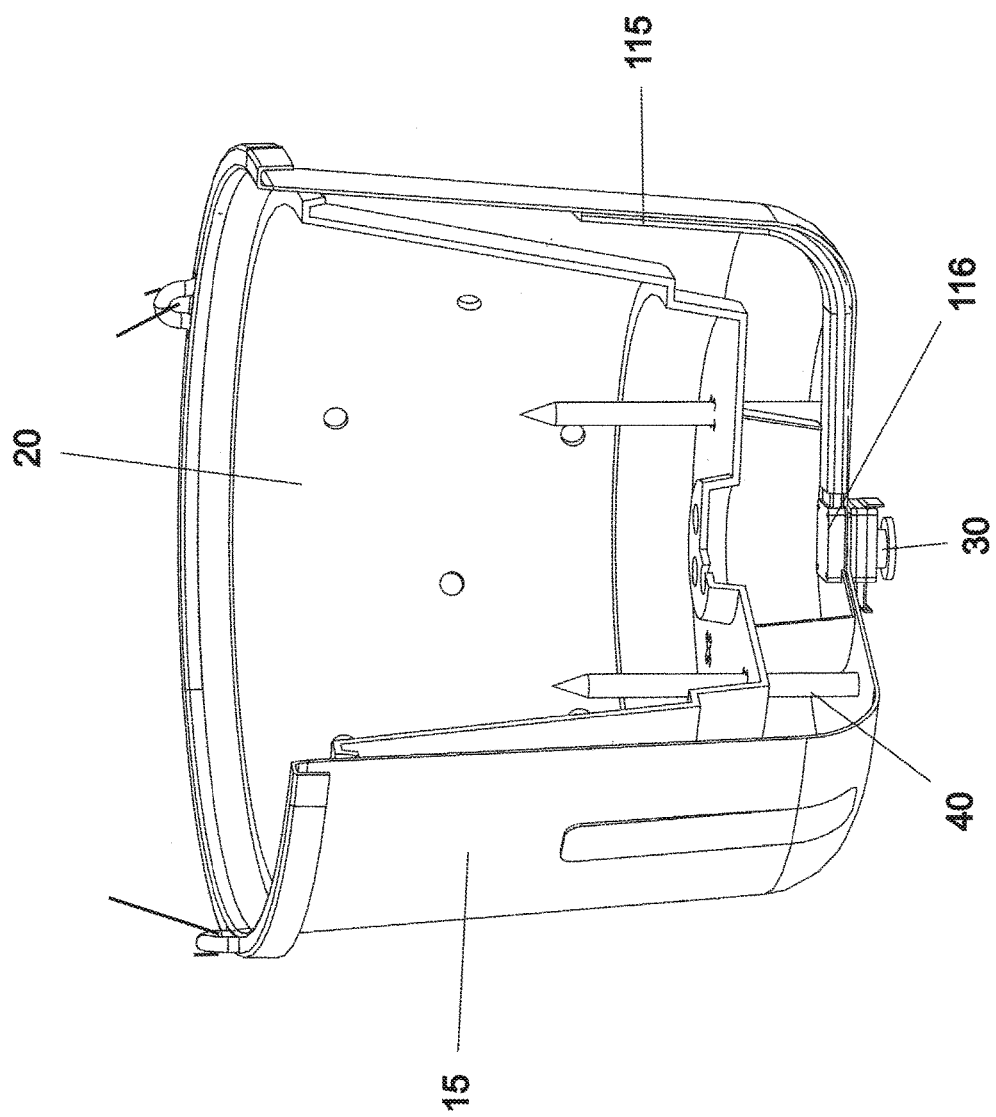
FIG. 10 is a perspective cut-out view of a hung potted plant system employing a spacer and water retention sticks, according to one embodiment of the present invention.

With reference to FIGS. 9 and 10, and according to one embodiment of the present invention, a cut out of the potted plant system 10 is shown in the hung orientation. As a result of hanging the potted plant system, the quick connect sliding valve 30 is positioned on the bottom of the outer pot 15. The inner pot 20 prohibits the water level adaptor 115 from extending directly upwards. As such, the valve adaptor 116 allows for the water level adaptor 115 to attach sideways into the quick connect sliding valve 30 thereby allowing the water level adaptor 115 to extend horizontally across the outer pot 15 until reaching the edge wherein the water level adaptor 115 extends upwards, between the inner and outer pot, 15 and 20, respectively. The water level adaptor 115 allows for the use of all inner pots 20, including the pots the potted plants were received at the plant nurseries. With specific reference to FIG. 10 a potted plant system 10 is shown in FIG. 9 with the addition of spacer 25 and wicks 40. In this configuration, the water reservoir is increased as there is a gap between the inner pot 20 and the outer pot 15. Due to the increased reservoir, wicks 40 are employed to transfer water from the reservoir to the soil (not shown) within the inner pot 20.

Figure 11:
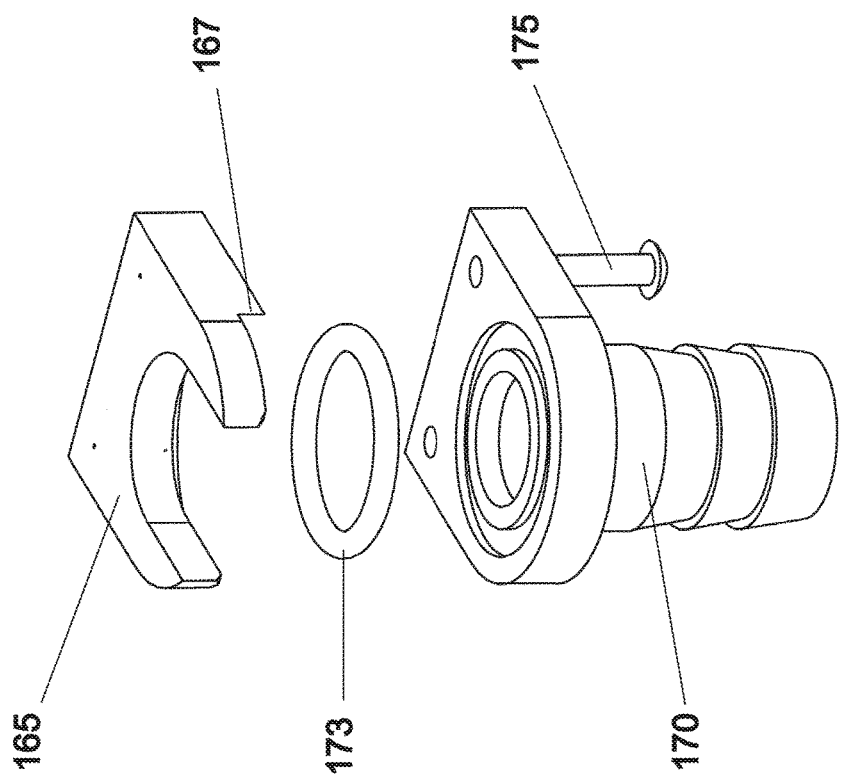
FIG. 11 is an exploded view of a quick attach connector used in the potted plant system, according to one embodiment of the present invention.

With reference to FIG. 11 and according to one embodiment of the present invention a quick attach draining connector 160 is shown. The quick attach draining connector 160 is shown in an exploded view. The quick attach draining connector 160 is primarily comprised of: U-shaped hook clasp 165; a draining chute 170; O-ring 173; and, U-shaped hook screws 175. The U-shaped hook clasp 165 contains a spacer beam 167. The spacer beam 167 provides a gap within the U-shaped hook clasp 165 where the quick attach draining connector 160 attaches to the quick connect sliding valve (not shown). The U-shaped hook clasp 165 is connected to the draining chute 170 through the use of U-shaped hook screws 175. The O-ring 163 creates a waterproof seal between the quick attach connector 160 and the quick connect sliding valve (not shown). The quick attach draining connector 160 provides a means for the user to quickly connect a hose (not shown) to the hanging potted plant system and drain the excess water to a distant location.

Figure 12B:
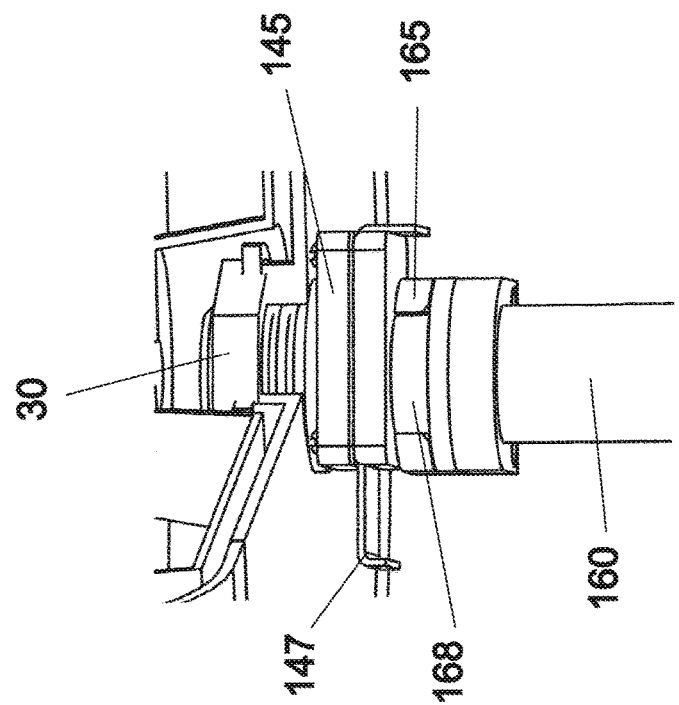
FIG. 12b is a magnified view of the quick connect sliding valve attached to both, the outer pot and to the quick attach connector, according to one embodiment of the present invention.
Figure 12A:
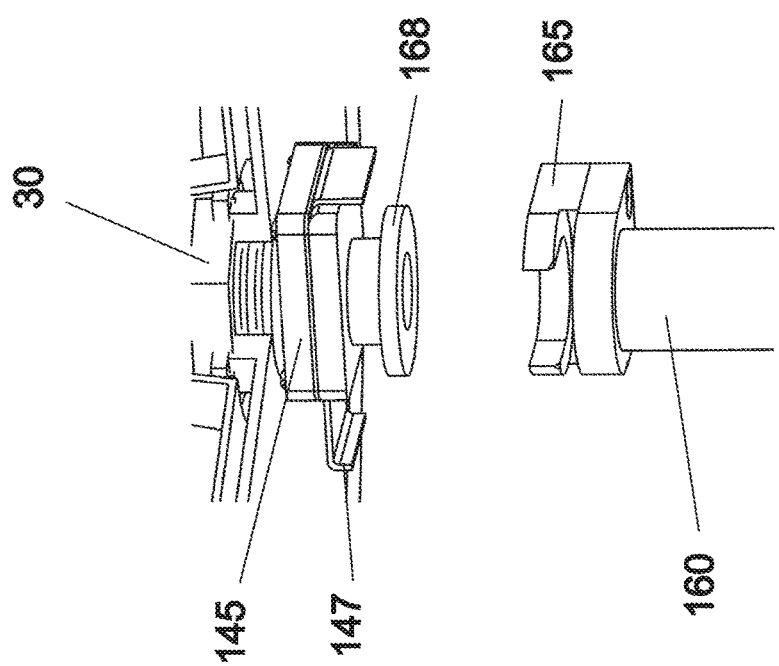
FIG. 12a is a magnified view of the quick connect sliding valve attached to the outer pot in close proximity to the quick attach connector, according to one embodiment of the present invention.

With reference to FIG. 12, and according to one embodiment of the present invention, the quick attach connector 160 attachment to the quick connect sliding valve 30 is shown. The quick attach connector 160 attaches to the outer neck enclosure 145 of the quick connect sliding valve 30. The outer neck enclosure 145 contains a neck 147 upon which the U-shaped hook clasp 165 couples too. The spacer beam 167 of the quick attach connector 160 provides for a gap that houses the neck frame 168 of the outer neck enclosure 145. With specific reference to FIG. 12b, the quick attach connector 160 is shown attached to the outer neck enclosure 145 of the quick connect sliding valve 30. The U-shaped hook clasp 165 couples around the neck 147 of the outer neck enclosure 145. The neck frame 168 of the outer neck enclosure 145 locks into the gap provided by the spacer beam 167 and prevents the quick attach connector 160 from sliding.

Figure 13:
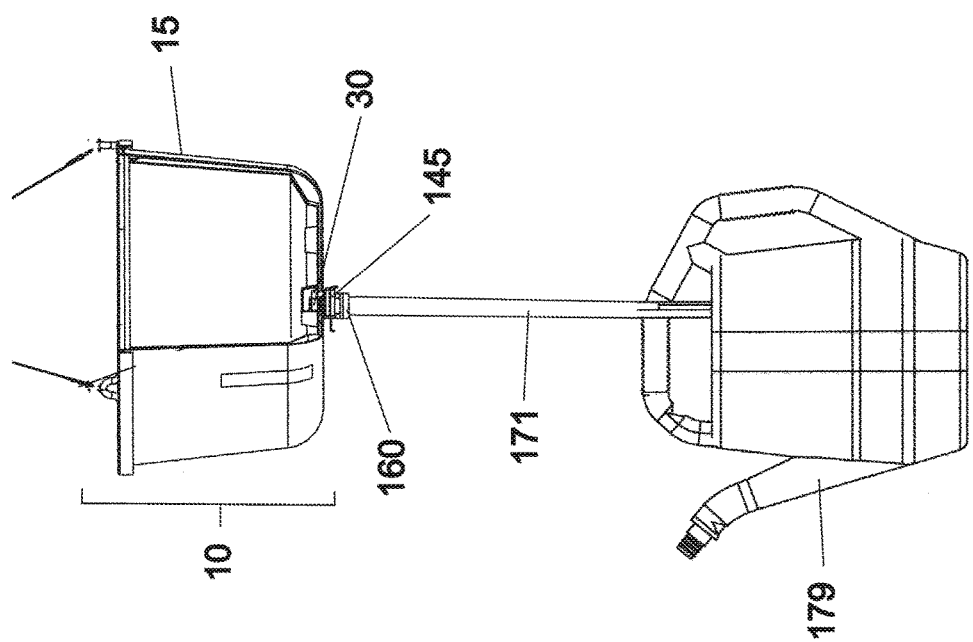
FIG. 13 is a front view of a cut-out of the hanging potted plant system draining into a watering bucket, according to one embodiment of the present invention.

With reference to FIG. 13 and according to one embodiment of the present invention, the draining of the hanging potted plant system 10 is shown. The draining of the hanging potted plant system 10 is accomplished when the quick connect sliding valve 30 is opened. Excess water (not shown) is expelled from the hanging potted plant system 10 which can cause problems for the user if the water is not diverted. The water can be diverted into a watering bucket 179 via a hose 171, as seen in FIG. 24, or it can be diverted to any umber of devices used to displace water. A worker skilled in the relevant art would appreciate the various means of diverting the excess expelled water (not shown) into a medium wherein the user can easily discard the expelled water (not shown). The quick attach connector 160 is used in conjunction with a hose 171 to drain the excess water (not shown) into a watering bucket 175 placed on the ground. In this configuration, the user is not required to lift a heavy watering bucket 175 containing the excess water up to a height of the hanging potted plant system 10. The hose 171 is attached to the quick attach connector 160, which is subsequently connected to the outer neck enclosure 145 of the quick connect sliding valve 30. As the quick connect sliding valve 30 is opened, the excess water (not shown) drains from the outer pot 15 reservoir into the quick attach connector 160, down the hose 171 and into a watering bucket 179. Once the excess water (not shown) is expelled into the watering bucket 179, the watering bucket 179 is subsequently emptied.

Figure 14:
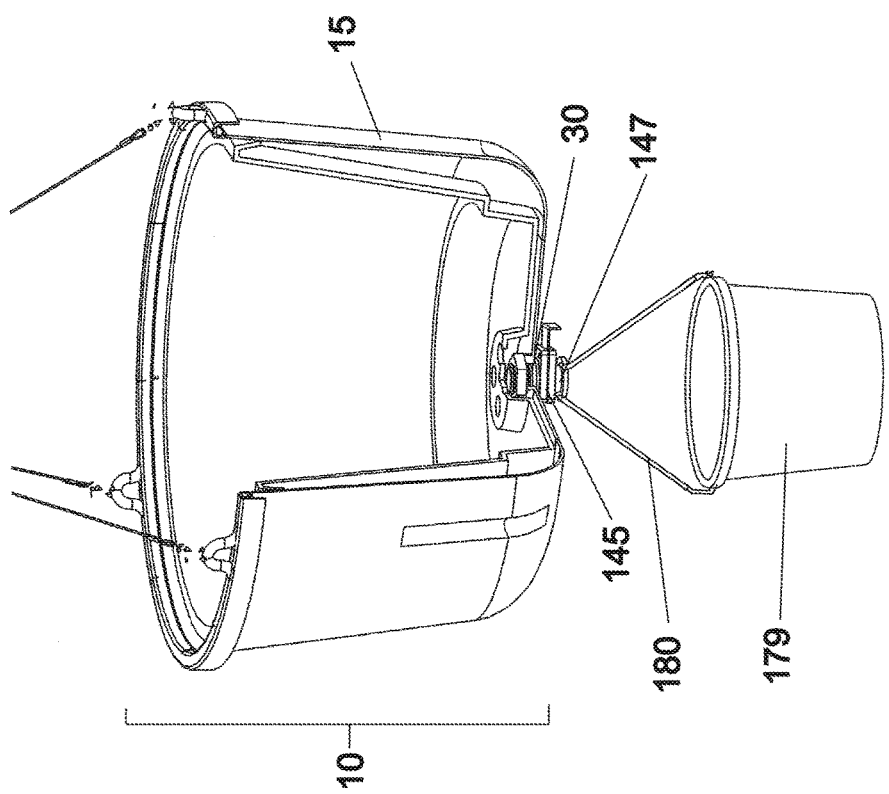
FIG. 14 is a perspective view of a cut-out of the hanging potted plant system with an attached modified bucket, according to one embodiment of the present invention.

With reference to FIG. 14 and according to one embodiment of the present invention, the draining of excess water from the potted plant system 10 is shown connected to a hanging bucket. A small bucket 179 is hung from the quick connect sliding valve 30 in order to catch the excess water expelled from the hanging potted plant system 10. The small bucket 179 uses a curved handle 180 to loop around the neck 147 of the outer neck enclosure 145. Once the excess water (not shown) is expelled into the small bucket 179, the small bucket 179 is removed from the outer neck enclosure 145 and is subsequently emptied.

Figure 15:
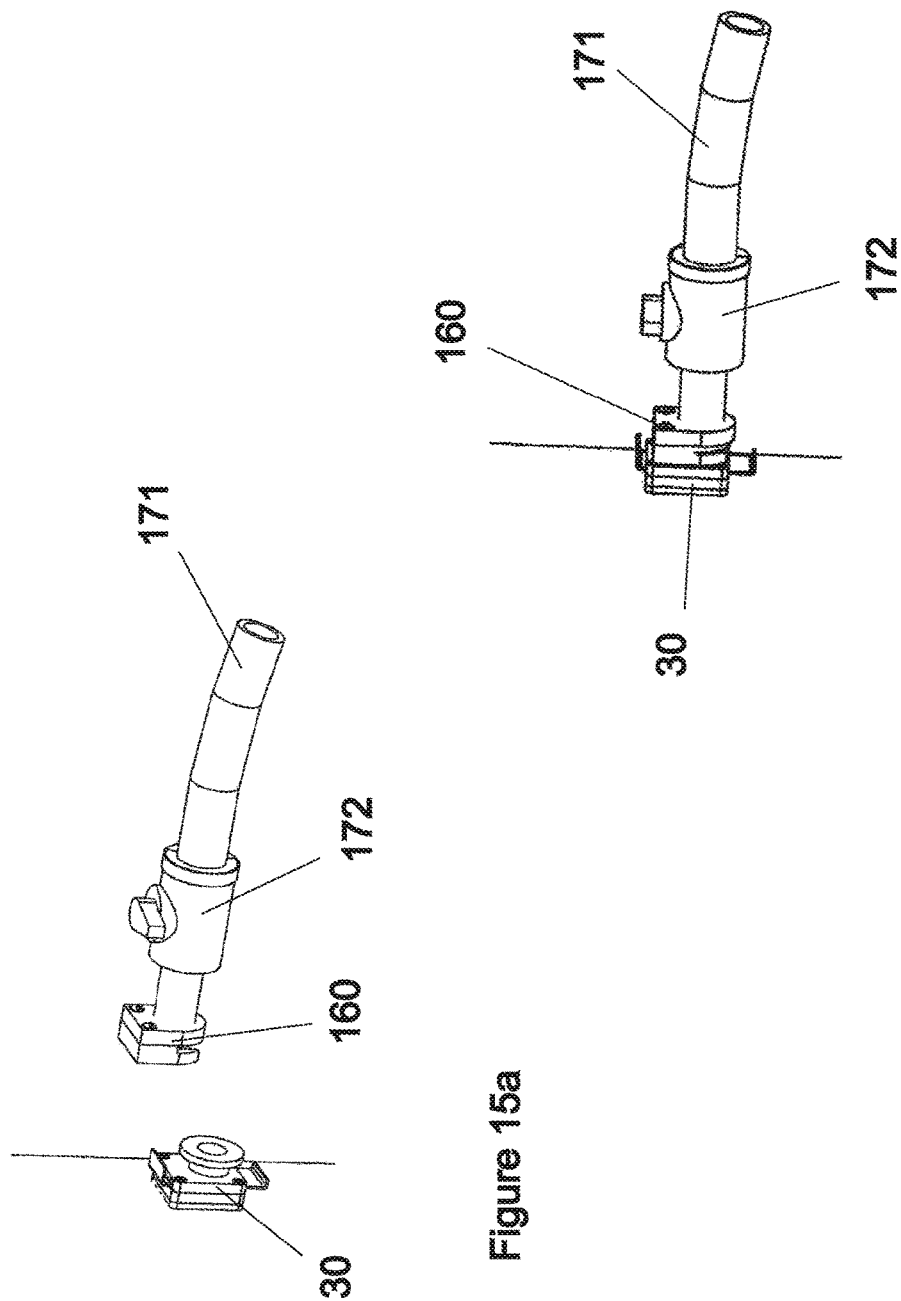
FIG. 15a is a magnified perspective view of quick attach connector fitted with a hose connector valve and a hose spatially aligned for attachment onto the quick connect sliding valve, according to one embodiment of the present invention.
FIG. 15b is a magnified perspective view of quick attach connector fitted with a hose attached onto the quick connect sliding valve, according to one embodiment of the present invention.
Figure 16:
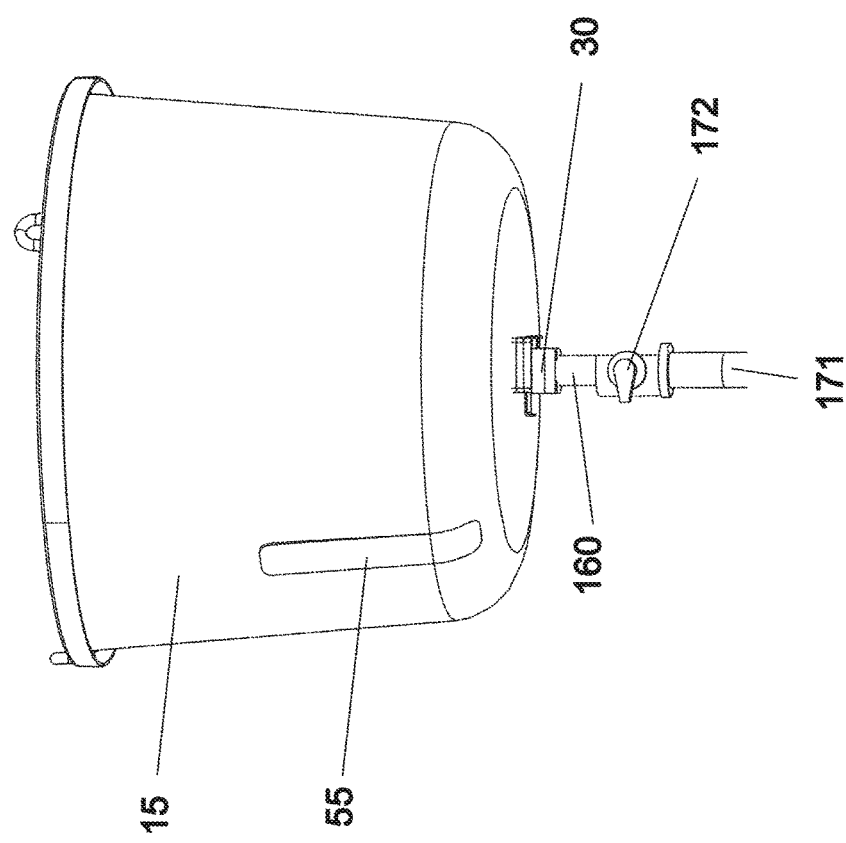
FIG. 16 is a perspective view of a hung potted plant system fitted with the quick connect sliding valve, a quick attach connector, a hose connector valve and a hose, according to one embodiment of the present invention.

With specific reference to FIGS. 15 and 16 and according to one embodiment of the present invention, a magnified image of the quick connect sliding valve 30 is shown attaching to a hose 171 through the hose connector valve 172. FIGS. 15a and 15b illustrate the attachment of the hose 171 through the hose connector valve 172 to a quick connect sliding valve 30 when positioned on the side of the outer pot (not shown). The hose connector valve 172 slides onto the quick connect sliding valve 30 thereby providing a water tight seal. The hose connector valve 172 allows the quick connect sliding valve 30 to be open at all times, as the connector valve 172 can be open or closed. The hose connector valve 172 is attached to a hose 171 which displaces the water from the potted plant system (not shown) to a bucket or a drain (not shown) when the hose connector valve 172 and the quick connect sliding valve 30 are opened. With specific reference to FIG. 16, the quick connect sliding valve 30 is shown positioned at the bottom of the outer pot 15. The hose connector valve 172 is attached to the quick connect sliding valve 30 in a similar fashion thereby allowing excess water to escape then the draining connector 172 and the quick connect sliding valve 30 are opened.

Figure 17:
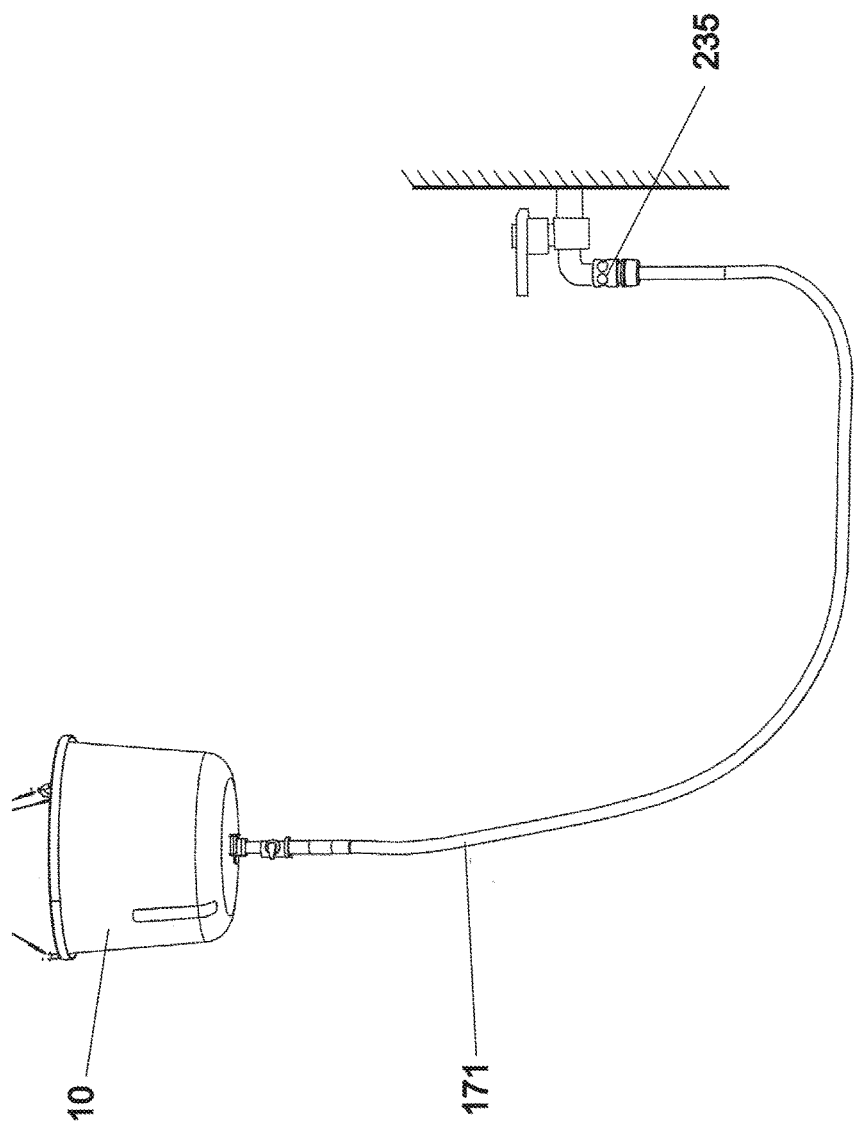
FIG. 17 is a perspective view of the potted plant system attached to a water tap supply source, according to one embodiment of the present invention.

With reference to FIG. 17 and according to one embodiment of the present invention, the potted plant system 10 is shown connected to a water source. A hose 171 attaches to a water source like a tap water runs through the water tap to the hose connector valve 172. The water pressure exiting a tap is high and would cause some damage to the potted plant system 10 if allowed to enter the outer pot 15 with the same pressure. As such, the hose connector valve 172 contains valves that reduce the water pressure and allow the water to enter the outer pot 15 at a lower pressure.

Figure 18:
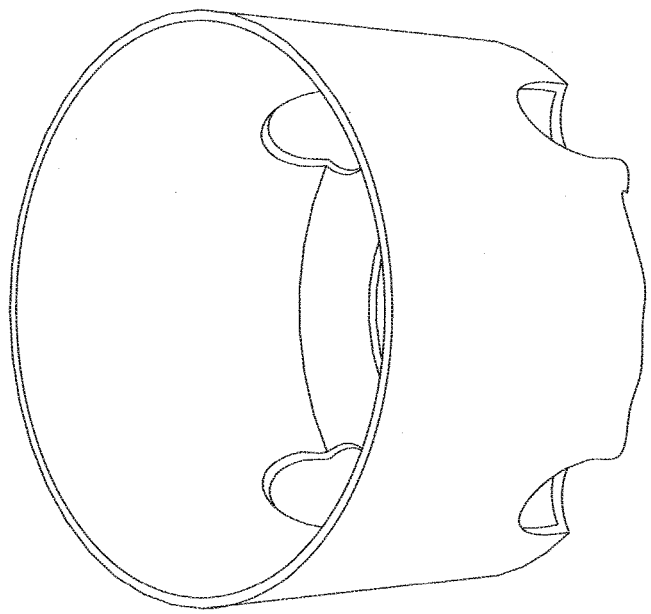
FIG. 18 is a perspective cut-out view of a spacer for the potted plant system, according to one embodiment of the present invention.

With specific reference to FIG. 18 and according to one embodiment of the present invention, the spacer 35 is shown. The spacer 35 shown provides for the use in potted plant systems (not shown) where the quick connect sliding valve (not shown) is placed on the side of the outer pot (not shown). Alternatively, the spacer 35 can be used in hanging potted plant systems (not shown) provided that the water level adaptor 115 extends out to the side and extends up the side wall of the outer pot (not shown).

Figure 19:
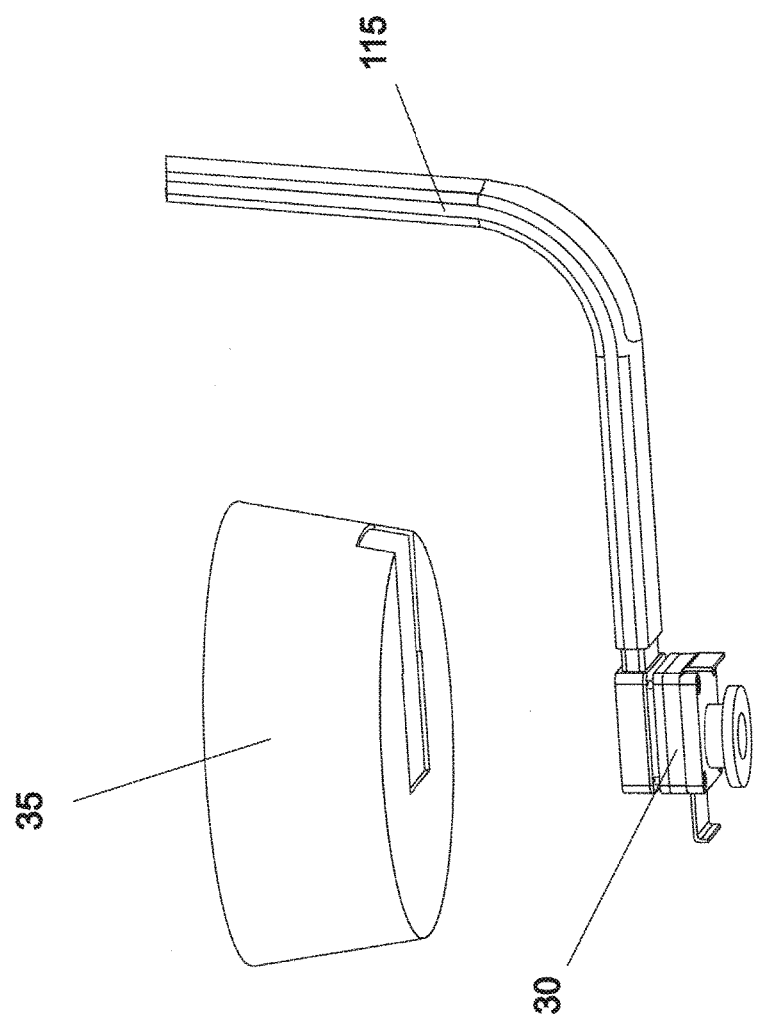
FIG. 19 is a lower perspective view of a quick connect sliding valve fitted with a draining pipe setting into the spacer, according to one embodiment of the present invention.
Figure 20:
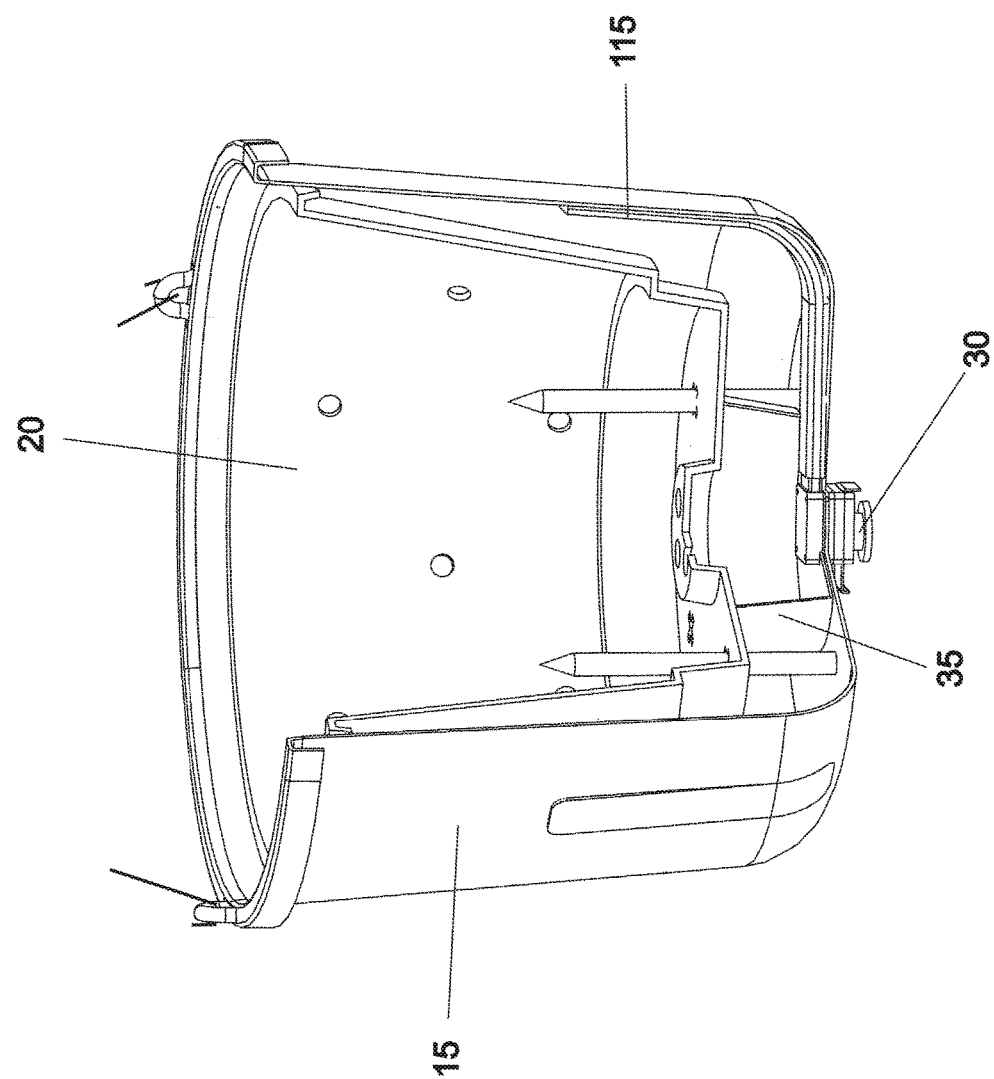
FIG. 20 is a perspective cut out view of the of a hanging potted plant system containing the spacer, draining pipe and wicks, according to one embodiment of the present invention.

With specific reference to FIGS. 19 and 20, and according to one embodiment of the present invention, the quick connect quick connect sliding valve 30 fitted with a water level adaptor 115 setting into the spacer 35 within the potted plant system 10. The spacer 35 contains an aperture which provides for a space where the water level adaptor 115 can set within while in the horizontal position. The vertical extension of the water level adaptor 115 does not interact with the spacer 35 and as such, the spacer 35 does not need to accommodate the vertical portion of the water level adaptor 115. With specific reference to FIG. 20 the quick connect sliding valve 30 fitted within with a water level adaptor 115 set within the space 35 is shown within the potted plant system 10.

The inner pot 20 rests upon the spacer 35, thereby creating a reservoir between the inner pot 20 and the outer pot 15. The water level adaptor 115 runs along the outer pot 15, thereby avoiding all of the remaining components of the potted plant system 10. The increased reservoir permits storage of a larger volume of water that is in fluid connectivity with the inner pot 20 thereby increasing the time between watering of the potted plant (not shown) housed in the potted plant system 10.

Figure 21:
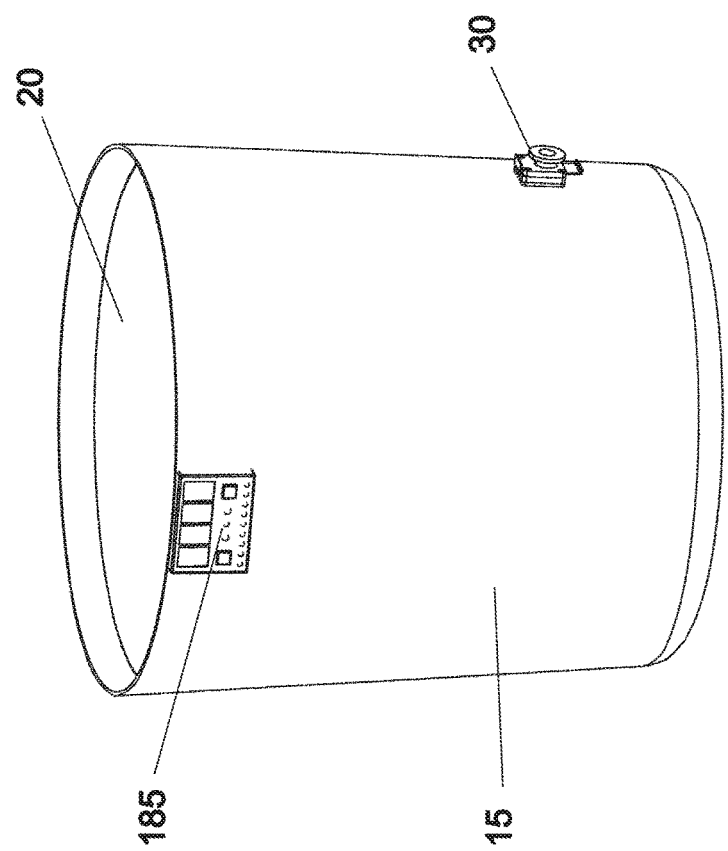
FIG. 21 is a perspective view of a potted plant system operating with a water monitor, according to one embodiment of the present invention.
Figure 22:
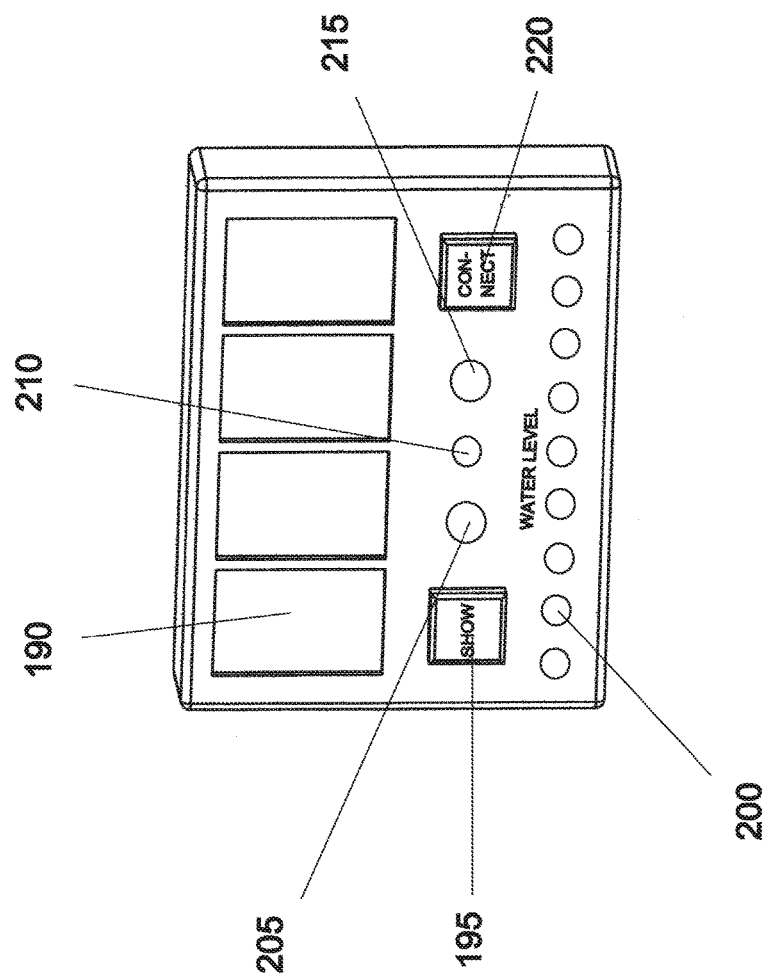
FIG. 22 is a magnified perspective view of a water monitor, according to one embodiment of the present invention.

With specific reference to FIGS. 21 and 22, and according to one embodiment of the present invention, the potted plant system 10 is shown with the attached water monitor 185. The water monitor 185 is a electric device that replaces the water level indicator (not shown). The water monitor 185 can assesses the water level within the reservoir (not shown), which is the space between the outer and inner pots, 15 and 20 respectively, and display the water level on an easy to ready display. The water monitor 185 is placed on the outer part of the outer pot 15 where it can read by the user. Upon analysis of the water monitor 185, the user can add more water or expel water through the quick connect sliding valve 30. With specific reference to FIG. 22, a magnified view of the water monitor 185 is shown. The water monitor 185 operates through an electrical circuit, and obtains an electrical current through light received by the solar cells 190. To determine the amount of water within the reservoir, the user presses the indicator button 195 which lights up the water indicator level 200. To eliminate issues with too much water or no water, the water monitor 185 contains a no water indicator 205 and a too much water indicator 210. The user is not required to press the indicator button 195 to determine whether there is no water or if there is too much water. The no water indicator 205 and too much water indicator 210 lights up automatically when the water level within the reservoir reaches certain limits. The water monitor 185 can be wirelessly linked to other devices through a Bluetooth or wifi connection. A worker skilled in the relevant art would appreciate the various means to wirelessly connect to electronic devices. A wireless connection provides a means of providing a system which automatically adds water to the potted plant system (not shown) upon the water monitor 185 determining the water level is too low. The LED connection indicator 210 will light up once the water monitor 185 is wirelessly connected to another device.

Figure 23B:
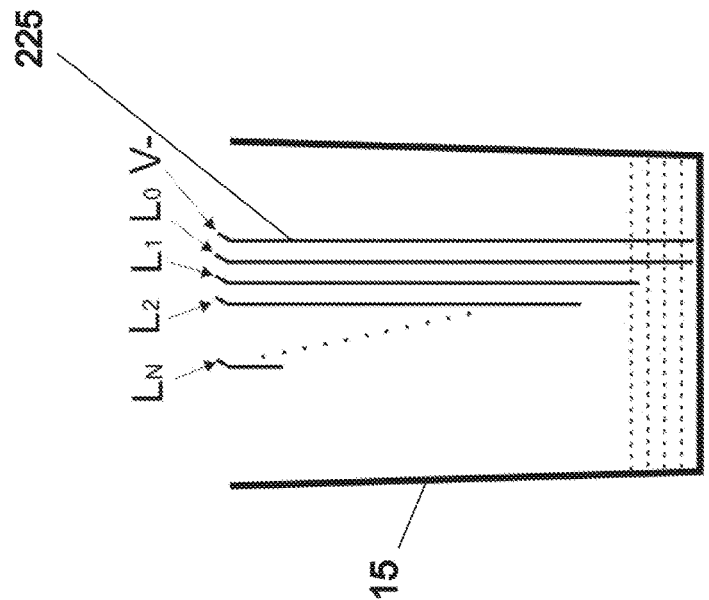
FIG. 23b is an illustration of the electric connection strips, according to one embodiment of the present invention.
Figure 23A:
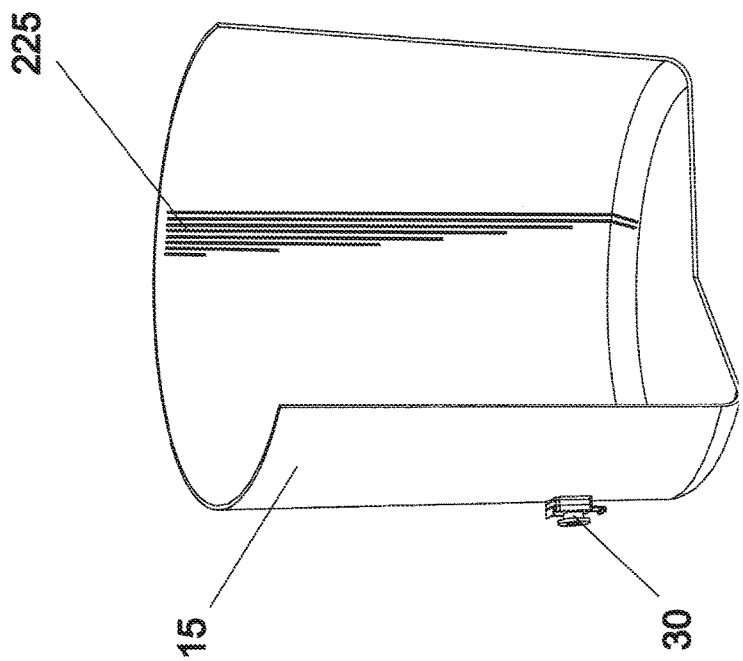
FIG. 23a is a perspective cut-out view of an outer pot fitted with the electric connection strips, according to one embodiment of the present invention.

With specific reference to FIG. 23, and according to one embodiment of the present invention, the electronic ribbon cable 225 is shown. The electronic ribbon cable 225 is used to electronically indicate the water level within the outer pot 15. The electronic ribbon cable 225 connects to the water monitor (not shown) and provides the water level within the reservoir. With specific reference to FIG. 23a, a cut out of the outer pot 15 is shown to illustrate the location of the electronic ribbon cable 225. The information that is sent from the electronic ribbon cable 225 is displayed on the water monitor (not shown) to determine the water level. The electronic ribbon cable 225 is a set of wires of various lengths that extend to the bottom of the outer pot 15. The bottom of the wires within the ribbon cable 225 are exposed. With specific reference to FIG. 23b, an electric schematic of the electronic ribbon cable 225 is shown within the outer pot 15. As water enters the water reservoir and rises it makes contact in succession with the various exposed wires within the electronic ribbon cable 225. As water makes contact with a wire, it completes the circuit of the single wire and thus illuminates a single light on the water monitor (not shown) to indicate the water has reached that level. As water rises within the water reservoir more wires come into contact with the water, thereby completing more electric circuits and lighting up more led lights within the water monitor (not shown). A series of lights on the water monitor (not shown) correspond to each wire on the electronic ribbon cable 225, and as such, indicate the amount of water within the reservoir. A worker skilled in the relevant art would appreciate that electronic ribbon cable 225 is not only one way of indicating water level within the outer pot 15. As such, a worker skilled in the relevant art would appreciate the various means of electronically or mechanically indicating the water level within the water reservoir of the outer pot 15.

Figure 24B:
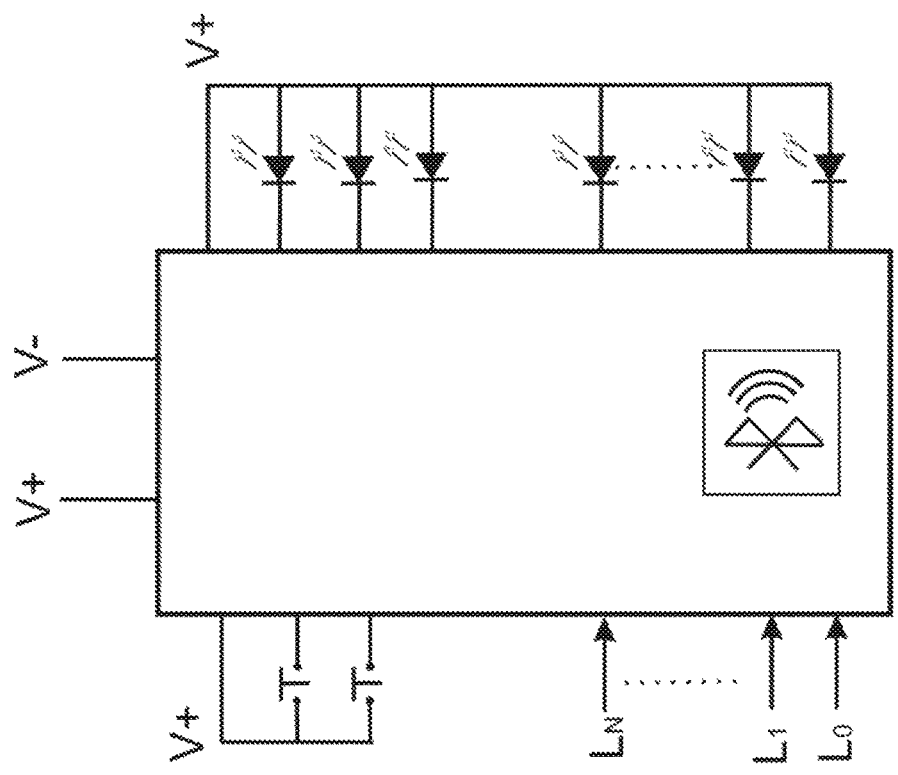
FIG. 24b is a schematic of the electrical circuit for the water monitor in the potted plant system, according to one embodiment of the present invention.
Figure 24A:
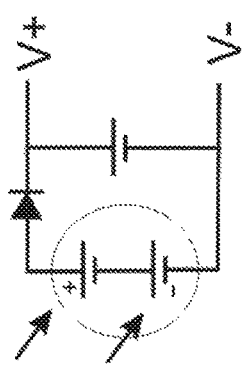
FIG. 24a is a schematic of the electrical circuit for a power source to the water monitor, according to one embodiment of the present invention.

With specific reference to FIGS. 24*a* and 24*b* and according to one embodiment of the present invention, the electrical circuit is shown relating to the water monitor. With specific reference to FIG. 24*a*, a power supply for the water monitor is shown and can be any known power supply known by a worker skilled in the relevant art. With reference to FIG. 24*b*, the power source from FIG. 24*a* is connected to an electrical diagram as would be known by a worker skilled in the relevant. The electrical configuration of the water monitor 185 as shown in FIG. 22 is based on the knowledge of a worker skilled in the relevant art.

Figure 25:
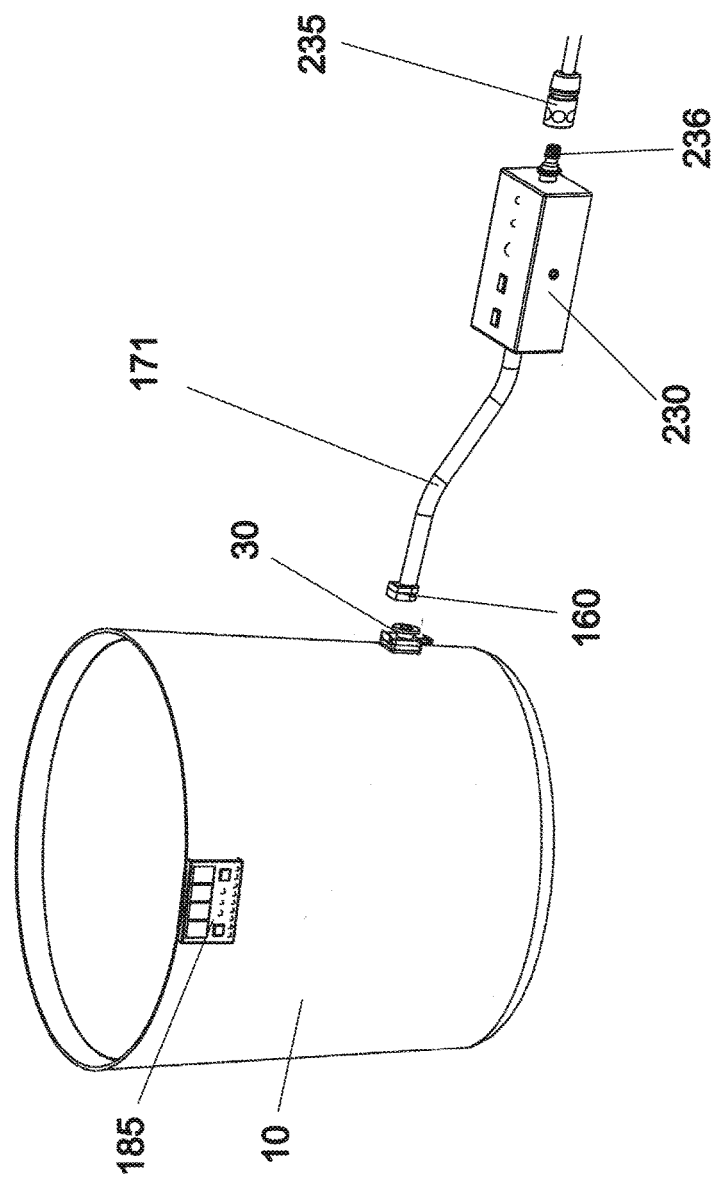
FIG. 25 is a perspective view of a potted plant system attached to the remotely controlled water supply unit, according to one embodiment of the present invention.
Figure 26:
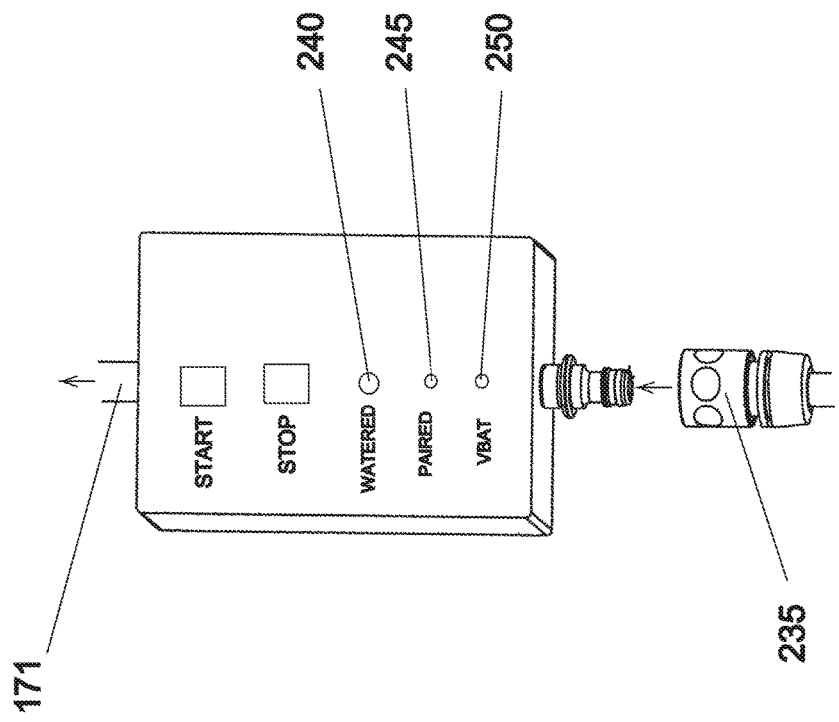
FIG. 26 is a perspective view of a remotely controlled water supply unit, according to one embodiment of the present invention.

With specific reference to FIGS. 25 and 26 and according to one embodiment of the present invention, the remotely controlled water supply unit 230 is shown operating within the potted plant system 10. The remotely controlled water supply unit 230 wirelessly connects with the water monitor 185 to determine the water level within the reservoir of the outer pot 15. Based on the water level within the water reservoir, the remotely controlled water supply unit 230 determines whether to automatically add water to the potted plat system 10. The remotely controlled water supply unit 230 has a water supply connector 236 which can be quickly connected to a water supply and water lines 235. The remotely controlled water supply unit 230 is powered by a rechargeable battery that is recharged through a power jack and current regulator from the household electrical power charger. When turned on and wirelessly connected to the water monitor 185, the remotely controlled water supply unit 230 can automatically add water from the water supply into the reservoir of the outer pot 15, through the open quick connect sliding valve 30. Upon receiving a too low signal from the water monitor 185 the remotely controlled water supply unit 230 opens the internal solenoid valve and allows water to enter the outer pot 15 and refill the reservoir. A worker skilled in the relevant art would appreciate the various means of opening and closing a water supply from entering the outer pot 15. As water enters the outer pot 15, the water monitor 185 continues to monitor the water level and send a stop signal to the remotely controlled water supply unit 230 once the water level has reached a desired height. Upon receiving a stop signal, the remotely controlled water supply unit 230 closes the internal solenoid valve and stops water from flowing from the water source to the outer pot 15. As such, the user no longer is involved in the watering process, as additional watering is achieved through: 1. detection of low water within the reservoir by the water monitor 185; 2. the transmission of low water to the remotely controlled water supply unit 230; 3. the opening of the remotely controlled water supply unit 230 internal valve to allow water to pass from the water source to the outer pot 15; 4. the detection of water filling the outer pot 15; 5. the detection by the water monitor 185 that water level has reached a desired height within the outer pot 15; 6. The transmission of a sufficient water to the remotely controlled water supply unit 230; 7. the closing of the remotely controlled water supply unit 230 internal valve to cease water flow from entering the outer pot 15.

Figure 27B:
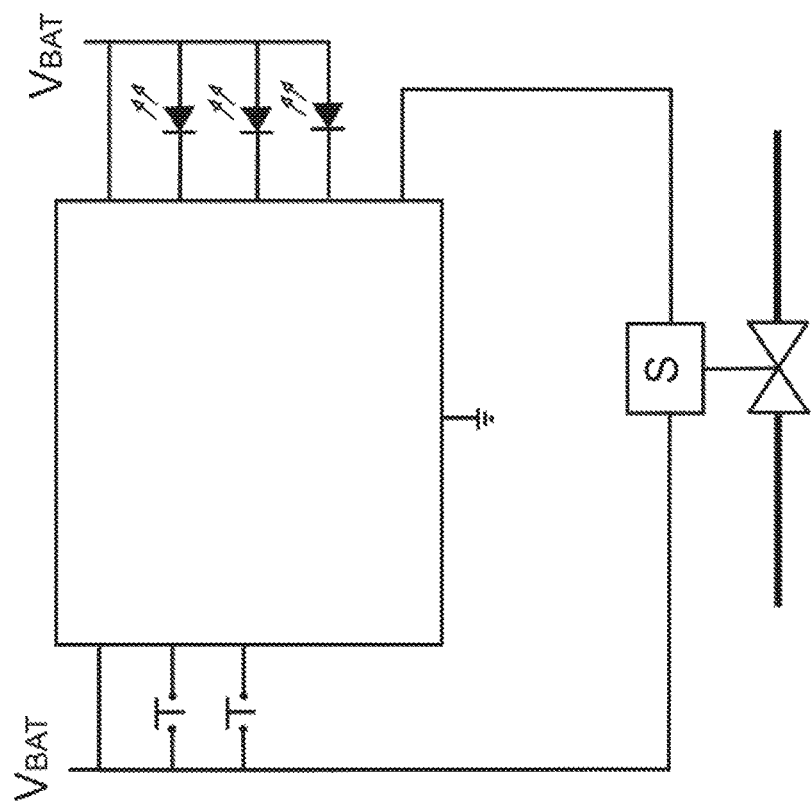
FIG. 27a is a schematic of the electrical circuit for a power source for the remotely controlled water supply unit, according to one embodiment of the present invention; and, FIG. 27b is a schematic of the electrical circuit of the remotely controlled water supply unit, according to one embodiment of the present invention.
Figure 27A:
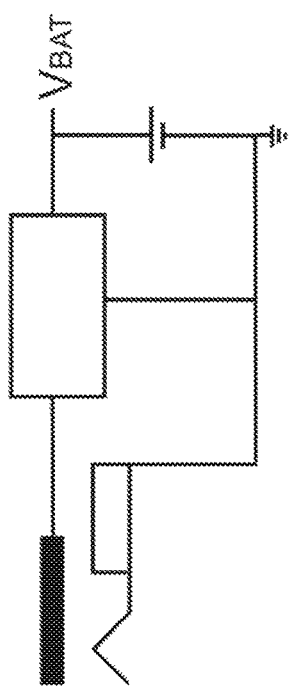

With specific reference to FIGS. 27*a* and 27*b* and according to one embodiment of the present invention, the electrical circuit is shown relating to the remotely controlled water supply unit. With specific reference to FIG. 27*a*, a battery source is shown and can be any known power source as would be known by a worker skilled in the relevant art. With reference to FIG. 27*b*, the power source from FIG. 27*a* is connected to an electrical diagram as would be known by a worker skilled in the relevant. The electrical configuration of the remotely controlled water supply unit as shown in FIG. 26 is based on the knowledge of a worker skilled in the relevant art.

The invention claimed is:

1. A potted plant system comprising:
   an outer pot configured to receive an inner pot wherein said outer pot holds water;
      wherein receiving of the inner pot by the outer pot creates a reservoir that is in fluid communication with the inner pot wherein fluid is passively diffused between the reservoir and the inner pot;
   a quick connect sliding valve positioned on the outer pot to alter water level within the reservoir; and
   a water level adaptor connected to the quick connect sliding valve positioned within the outer pot to maintain a predetermined water level from being displaced from within the reservoir;
wherein the reservoir allows for fluid connectivity between the reservoir and the inner pot;
wherein the water level adaptor provides a channel for passage of excess fluid from the outer pot upon over saturation of the reservoir.

2. The potted plant system of claim 1, further comprising an interchangeable spacer of various lengths positioned within the outer pot to increase volume of the reservoir.

3. The potted plant system of claim 1, wherein quick connect sliding valve is positioned on a side wall of the outer pot.

4. The potted plant system of claim 1, wherein quick connect sliding valve is positioned on a bottom of the outer pot.

5. The potted plant system of claim 1, further comprising of wicks positioned through a bottom of the inner pot to aid in passive diffusion of fluid from the reservoir to the inner pot.

6. The potted plant system of claim 1, further comprising dispersed apertures within the inner pot providing fluid connectivity between the reservoir and the inner pot.

7. The potted plant system of claim 1, further comprising a water monitor which electronically monitors a water level of the reservoir.

8. The potted plant system of claim 1, further comprising a remotely controlled water supply unit automatically controlling the fluid level within the reservoir through addition and removal of fluid from a fluid source through the water level adaptor.

\* \* \* \* \*